United States Patent
Takeda et al.

(10) Patent No.: US 11,816,611 B2
(45) Date of Patent: Nov. 14, 2023

(54) WORK SUPPORT APPARATUS AND WORK SUPPORT METHOD

(71) Applicant: Hitachi, Ltd., Tokyo (JP)

(72) Inventors: Eriko Takeda, Tokyo (JP); Hajime Kanzaki, Tokyo (JP); Nobuyuki Muranaka, Tokyo (JP); Daisuke Ishii, Tokyo (JP)

(73) Assignee: Hitachi, Ltd., Tokyo (JP)

(*) Notice: Subject to any disclaimer, the term of this patent is extended or adjusted under 35 U.S.C. 154(b) by 64 days.

(21) Appl. No.: 17/730,441

(22) Filed: Apr. 27, 2022

(65) Prior Publication Data
US 2022/0366353 A1 Nov. 17, 2022

(30) Foreign Application Priority Data

May 17, 2021 (JP) .................................. 2021-083452

(51) Int. Cl.
| | | |
|---|---|---|
| *G06Q 10/0631* | (2023.01) | |
| *G06Q 50/04* | (2012.01) | |
| *H04W 4/30* | (2018.01) | |

(52) U.S. Cl.
CPC ..... *G06Q 10/063118* (2013.01); *G06Q 50/04* (2013.01); *H04W 4/30* (2018.02)

(58) Field of Classification Search
CPC .......... G06Q 10/00–50/00; H04W 4/00–92/00
USPC .............................................. 705/7.11–7.42
See application file for complete search history.

(56) References Cited

U.S. PATENT DOCUMENTS

| | | | | |
|---|---|---|---|---|
| 8,364,440 | B2* | 1/2013 | Putkonen | G06Q 10/06 702/182 |
| 9,129,233 | B2* | 9/2015 | Moughler | G06Q 10/1097 |
| 10,211,859 | B2* | 2/2019 | Chin | G02B 27/0172 |
| 10,635,796 | B2* | 4/2020 | Tian | G06F 21/32 |
| 10,922,141 | B2* | 2/2021 | Srinivasan | G06F 9/5077 |
| 11,392,871 | B2* | 7/2022 | Sakurai | G06T 7/0006 |
| 2013/0226639 | A1* | 8/2013 | Yokoyama | G06Q 10/06 705/7.14 |
| 2014/0278638 | A1* | 9/2014 | Kreuzkamp | G06Q 10/06398 705/7.15 |
| 2014/0278645 | A1* | 9/2014 | Davidson | G06Q 10/063114 705/7.15 |

(Continued)

FOREIGN PATENT DOCUMENTS

| | | |
|---|---|---|
| JP | 2017-49762 A | 3/2017 |
| JP | 2020-35330 A | 3/2020 |

*Primary Examiner* — Alan S Miller
(74) *Attorney, Agent, or Firm* — Crowell & Moring LLP

(57) ABSTRACT

A work support apparatus, which assigns an operator to an operation performed in a workplace, includes a communication device used for the operation in the workplace, and holds information on a relationship between a process, an operation, and each of divided areas of the workplace and the communication device used for the operation, information on a predicted communication throughput by the communication device in each of the divided areas, and information on an operator-requested communication throughput for a combination of the operation and an operator. For each operation corresponding to the process, the apparatus determines assignment of an operator to the operation, referring to the predicted communication throughput by the communication device and the operator-requested communication throughput, and outputs a result of the operator assignment.

12 Claims, 28 Drawing Sheets

(56) References Cited

U.S. PATENT DOCUMENTS

| | | | | |
|---|---|---|---|---|
| 2015/0015461 | A1* | 1/2015 | Morimoto | A61B 5/742 |
| | | | | 345/8 |
| 2017/0061212 | A1* | 3/2017 | Tanaka | G02B 27/017 |
| 2017/0235466 | A1* | 8/2017 | Tanwir | G06F 3/0481 |
| | | | | 715/738 |
| 2019/0118825 | A1* | 4/2019 | Madrigal | G07C 5/0841 |
| 2019/0373164 | A1* | 12/2019 | Okada | H04N 23/63 |
| 2020/0074361 | A1* | 3/2020 | Akatsuka | G06Q 10/06398 |

\* cited by examiner

FIG. 5

| AREA ID | PREDICTED COMMUNICATION THROUGHPUT | ... | AREA ID | PREDICTED COMMUNICATION THROUGHPUT |
|---|---|---|---|---|
| A-00 | */* | ... | G-00 | */* |
| A-01 | */* | ... | G-01 | */* |
| A-02 | */* | ... | G-02 | */* |
| A-03 | */* | ... | G-03 | */* |
| A-04 | */* | ... | G-04 | */* |
| A-05 | */* | ... | G-05 | */* |
| A-06 | */* | ... | G-06 | */* |

| OPERATOR ID (301a) | OPERATION ID (301b) | INSTRUCTION METHOD (301c) | INSTRUCTION INTERVAL [s] (301d) | IMAGE TRANSMISSION INTERVAL [s] (301e) | OPERATOR-REQUESTED COMMUNICATION THROUGHPUT (301f) |
|---|---|---|---|---|---|
| P001 | Op-01-I | TEXT |  |  | */* |
|  | Op-01-II | TEXT |  |  | */* |
|  | Op-01-III | TEXT |  |  | */* |
|  | ... | ... | ... | ... | ... |
| P002 | op-I | HIGH-DEFINITION IMAGE |  |  | */* |
|  | op-II | HIGH-DEFINITION IMAGE |  |  | */* |
|  | ... | ... | ... | ... | ... |
| ... | ... | ... | ... | ... | ... |

| PROCESS ID (302a) | START TIME (302b) | END TIME (302c) | OPERATION ID (302d) | APPARATUS ID (302e) | APPARATUS INSTALLATION AREA ID (302f) |
|---|---|---|---|---|---|
| L-01 | XX:XX | XX:XX | Op-01-I | Fd-01-I-1 | B-00 |
| | | | | Fd-01-I-2 | |
| | | | | Fd-01-I-3 | |
| | | | Op-01-II | Fd-01-II-1 | D-00 |
| | | | | Fd-01-II-2 | |
| | | | | Fd-01-II-3 | |
| | | | Op-01-III | Fd-01-III-1 | E-00 |
| | | | | Fd-01-III-2 | |
| | | | | Fd-01-III-3 | |
| | | | ... | ... | ... |
| L-02 | XX:XX | XX:XX | Op-02-I | ... | B-05 |
| | | | ... | ... | ... |

| OPERATION ID (304a) | OPERATOR ID (304b) | OPERATOR-REQUESTED COMMUNICATION THROUGHPUT (304c) |
|---|---|---|
| Op-01-I | P001 | */* |
| | P002 | */* |
| | P003 | */* |
| | P004 | */* |
| | ... | ... |
| Op-01-II | P001 | */* |
| | P002 | */* |
| | ... | ... |

| OPERATION ID (305a) | OPERATOR ID (305b) |
|---|---|
| Op-01-I | P001 |
| Op-01-II | P006 |
| Op-01-III | P007 |
| Op-01-IV | P002 |
| Op-01-V | P003 |
| Op-01-VI | P004 |
| Op-01-VII | P005 |
| ... | ... |

| PROCESS ID | OPERATION ID | APPARATUS ID |
|---|---|---|
| L-01 | ... | ... |
| L-02 | ... | ... |
| L-03 | Op-03-I | Fd-03-I-1 |
| | | Fd-03-I-2 |
| | | Fd-03-I-3 |
| | Op-03-II | Fd-03-II-1 |
| | | Fd-03-II-2 |
| | | Fd-03-II-3 |
| | Op-03-III | Fd-03-III-1 |
| | | Fd-03-III-2 |
| | | Fd-03-III-3 |
| | ... | ... |
| L-04 | ... | ... |
| L-05 | ... | ... |

FIG. 18

| APPARATUS ID | APPARATUS-REQUESTED COMMUNICATION THROUGHPUT | |
|---|---|---|
| | OPERATOR DEPENDENCY | UPSTREAM/DOWNSTREAM |
| Fd-01-I-1 | NOT EXIST | */* |
| Fd-01-I-2 | EXIST | CHANGE DEPENDING ON OPERATOR ID |
| Fd-01-I-3 | EXIST | CHANGE DEPENDING ON OPERATOR ID |
| Fd-01-II-1 | NOT EXIST | */* |
| Fd-01-II-2 | EXIST | CHANGE DEPENDING ON OPERATOR ID |
| Fd-01-II-3 | EXIST | CHANGE DEPENDING ON OPERATOR ID |
| Fd-01-III-1 | NOT EXIST | */* |
| Fd-01-III-2 | EXIST | CHANGE DEPENDING ON OPERATOR ID |
| Fd-01-III-3 | EXIST | CHANGE DEPENDING ON OPERATOR ID |
| ... | ... | ... |

| PROCESS ID | HEAD OPERATION AREA ID | TAIL OPERATION AREA ID |
|---|---|---|
| L-03 | B-05 | B-01 |
| L-04 | D-05 | D-01 |
| L-05 | F-05 | F-01 |

| PROCESS ID (314a) | OPERATION AREA ID (314b) | OPERATION ID (314c) | APPARATUS ID (314d) |
|---|---|---|---|
| L-03 | B-05 | Op-03-I | Fd-01-I-1 |
| | | | Fd-01-I-2 |
| | | | Fd-01-I-3 |
| | B-04 | Op-03-II | Fd-01-II-1 |
| | | | Fd-01-II-2 |
| | | | Fd-01-II-3 |
| | B-03 | Op-03-III | Fd-01-III-1 |
| | | | Fd-01-III-2 |
| | | | Fd-01-III-3 |
| | ... | ... | ... |
| L-04 | ... | ... | ... |
| | | | |

FIG. 21

| OPERATION AREA ID (315a) | PREDICTED COMMUNICATION THROUGHPUT (315b) | OPERATION ID (315c) | NON-OPERATOR-DEPENDENT APPARATUS-REQUIRED COMMUNICATION THROUGHPUT (315d) | OPERATOR COMMUNICATION THROUGHPUT (315e) |
|---|---|---|---|---|
| B-05 | */* | Op-03-I | */* | */* |
| B-04 | */* | Op-03-II | */* | */* |
| B-03 | */* | Op-03-III | */* | */* |
| B-02 | */* | Op-03-IV | */* | */* |
| B-01 | */* | Op-03-V | */* | */* |
| D-05 | */* | Op-04-I | */* | */* |
| D-04 | */* | Op-04-II | */* | */* |
| D-03 | */* | Op-04-III | */* | */* |
| ... | ... | ... | ... | ... |

| OPERATION ID (316a) | OPERATOR ID (316b) | COMMUNICATION REQUEST DETERMINATION RESULT (316c) |
|---|---|---|
| Op-03-I | P001 | OK |
| Op-03-II | P006 | OK |
| Op-03-III | P007 | OK |
| ... | ... | ... |
| Op-04-I | P003 | OK |
| Op-04-II | P004 | NG |
| Op-04-III | P005 | OK |
| ... | ... | ... |

FIG. 27

| OPERATION LAYOUT ID | PROCESS LINE INFORMATION | | |
|---|---|---|---|
| OPERATION LAYOUT#1 | PROCESS ID | HEAD OPERATION AREA ID | TAIL OPERATION AREA ID |
| | L-03 | B-05 | B-01 |
| | L-04 | D-05 | D-01 |
| | L-05 | F-05 | F-01 |
| OPERATION LAYOUT#2 | PROCESS ID | HEAD OPERATION AREA ID | TAIL OPERATION AREA ID |
| | L-03 | B-01 | B-05 |
| | L-04 | C-02 | G-02 |
| | L-05 | C-04 | G-04 |
| OPERATION LAYOUT#3 | PROCESS ID | HEAD OPERATION AREA ID | TAIL OPERATION AREA ID |
| | L-03 | B-01 | B-05 |
| | L-04 | C-02 | G-02 |
| | L-05 | G-04 | C-04 |

700a / 700 / 700b

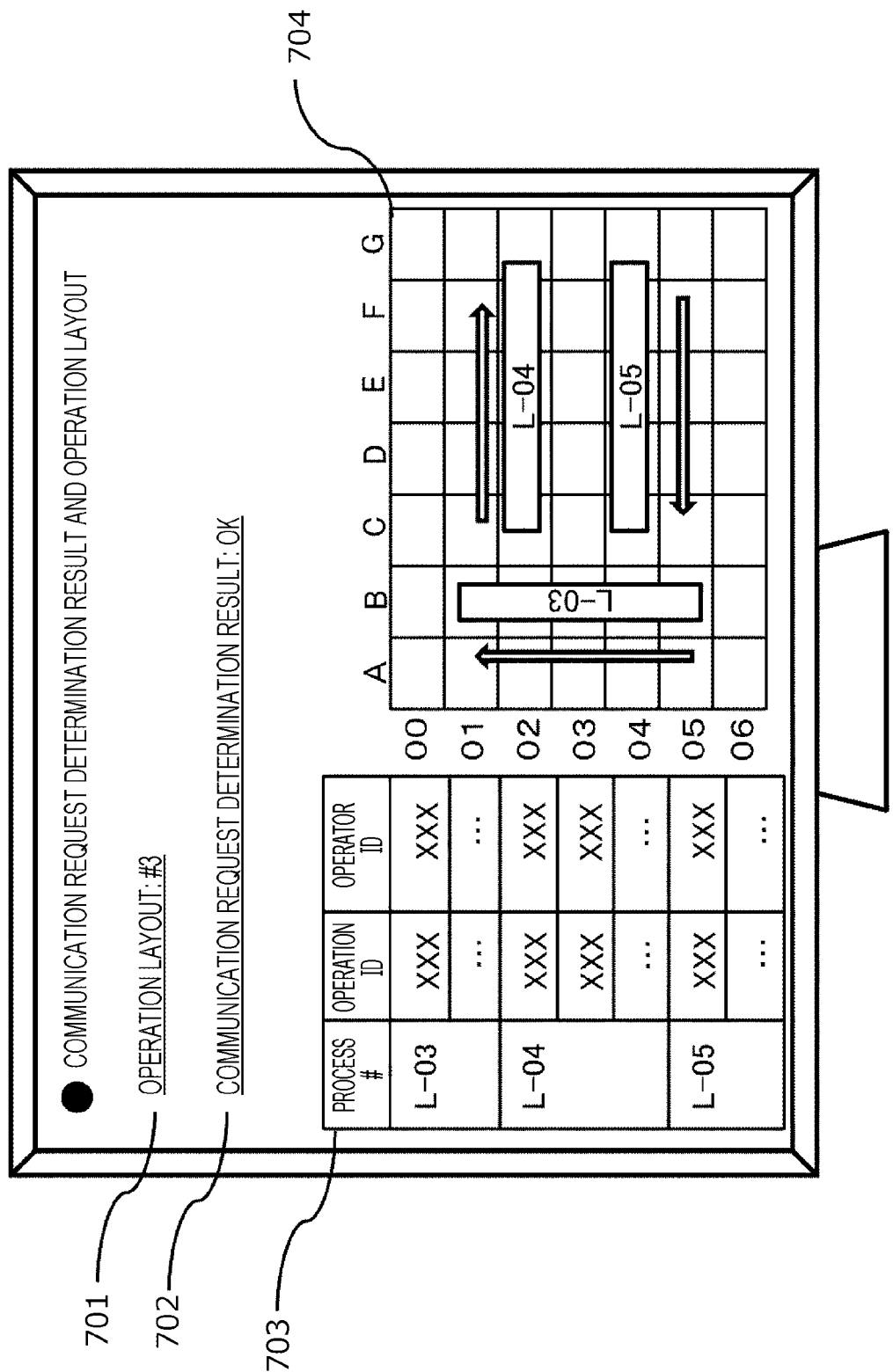

WORK SUPPORT APPARATUS AND WORK SUPPORT METHOD

BACKGROUND OF THE INVENTION

1. Field of the Invention

The present invention relates to a work support apparatus and a work support method, and particularly relates to a work support apparatus and a work support method that are suitable for properly assigning an operator to an operation while taking into consideration communication performance in a workplace.

2. Description of the Related Art

In recent years, with the development of communication technology and information processing technology, it has become common to acquire various types of information using wireless communication or the like in manufacturing processes, physical distribution operations, and the like, and quantify or visualize various events, thereby supporting the operations. In addition, it has also been studied to perform work support suitable for operators by using such information as mentioned above.

For example, JP 2020-35330 A discloses a technique of measuring ability of an individual to process an operation by an information processing apparatus and appropriately determining operator assignment. A performance measuring device described in JP 2020-35330 A acquires sensing data obtained by measuring an operator's action related to perceptual action and physical action. Analyzing the acquired sensing data, the device calculates a performance index for each element operation, compares a required performance index for each element operation included in each operation with a performance index calculated for each element operation, and based on the result of the comparison, assigns an operation to an operator, the operation including the performance index calculated for each element operation that meets a given condition with respect to the required performance index for each element operation.

JP 2017-49762 A, for example, discloses a technique by which actions made by a user at work are recognized and according to the result of the recognition, support details for the user are displayed. A system described in JP 2017-49762 A requires the user to wear a wearable terminal. The system detects actions of the user wearing the wearable terminal and the status of a device the user is using, and based on the result of the detection, displays information on operation details to the user. The wearable terminal is fitted with a projector including a control unit, which communicates with a server or an electronic device via a network to transmit/receive information. This communication is carried out by a wired or wireless means (paragraph 0015 in JP 2017-49762 A).

SUMMARY OF THE INVENTION

In general, when operations are assigned to operators according to their skill levels, such situations as the absence of a skilled operator or a sudden change of an operation schedule are difficult to deal with. One of measures to deal with such a situation is to provide support for operators so that every operator is able to carry out any kind of operation regardless of his or her skill level. This is done by, for example, acquiring sensing data, etc., on the operation conditions of an operator, and sending the sensing data to a server, which analyzes the data, and based on the result of the analysis, feed information on operation instructions back to the operator.

When such a measure is taken, it is conceivable that communication performance arising between the operator and the server may be different between the case of a skilled operator (expert operator) who is used to work by having a long period of experience with an operation and the case of a non-skilled operator (newcomer, etc.) who is not used to work by having only a short period of experience with the operation. That is, highly frequent sensing of operation conditions and detailed operation instructions, for example, instructions in a form of an image, a video, or the like, are required for an unskilled operator, whereas sensing of operation conditions is infrequent for a skilled operator, and a simple operation instruction, for example, an operation instruction by text is considered to be enough for the skilled operator.

When information on operation instructions to be given to an operator according to his or her skill level is transmitted/received by a wireless communication means, transmitting/receiving information takes much time in an environment where wireless communication performance is poor at a site where the operator carries out an operation. This may result in a case where, for example, even when the operator carries out an incorrect operation, it takes much time to analyze sensing data on the operation and give the operator an instruction on the correct operation, and consequently, there is a concern that the next operation may be started despite that the operator has not completed the correct operation.

The technique described in JP 2020-35330 A is the technique of assigning an operation to an operator according to the operator's performance, and the technique described in JP 2017-49762 A is the technique of transmitting information on the user's operation details from the server to the user by a wirelessly means and causing the wearable terminal the user is wearing to display the information. These techniques do not address the issue of properly assigning an operator an operation while taking into consideration the communication environment of an operation site.

An object of the present invention is to provide a work support apparatus that assigns an operator to an operation in such a way as to allow the operator to properly perform the operation while preventing overloading of a system by taking into consideration the communication environment of a workplace where the operation is performed.

A work support apparatus of the present invention in its preferable configuration assigns an operator an operation performed in a workplace. The work support apparatus includes a communication device used for an operation that is placed in the workplace. The work support apparatus holds: relation information on a relationship between a process, an operation, and each of areas and the communication device used for the operation, the areas being created by dividing the workplace into a plurality of sections; information on a predicted communication throughput by the communication device in each of the areas created by dividing the workplace into the sections; and information on an operator-requested communication throughput for a combination of the operation and an operator. For each operation corresponding to the process, the work support apparatus determines assignment of an operator to the operation, referring to the predicted communication throughput by the communication device and to the operator-requested communication throughput, and outputs a result of the operator assignment.

The present invention provides a work support apparatus that assigns an operator to an operation in such a way as to allow the operator to properly perform the operation while preventing overloading of a system by taking into consideration the communication environment of a workplace where the operation is performed.

BRIEF DESCRIPTION OF THE DRAWINGS

FIG. 5 depicts an example of an area communication table;

FIG. 6 depicts an example of an operation communication requirements relation table;

FIG. 7 depicts an example of a process information table;

FIG. 9 depicts an example of an operator/operation-related required communication throughput relation table;

FIG. 10 depicts an example of an operation assignment result table;

FIG. 16 depicts an example of an in-process use apparatus correspondence table;

FIG. 18 depicts an example of an apparatus-requested communication throughput table;

FIG. 19 depicts an example of a process line information table;

FIG. 20 depicts an example of an apparatus installation information table;

FIG. 21 depicts an example of an apparatus-considered operation communication throughput relation table;

FIG. 22 depicts an example of a communication request determination result table;

FIG. 27 depicts an example of operation layout conditions;

FIG. 29 depicts an example of a communication request determination result screen (No. 2).

DESCRIPTION OF THE PREFERRED EMBODIMENTS

Embodiments according to the present invention will now be described with reference to FIGS. 1 to 29.

First Embodiment

A first embodiment according to the present invention will hereinafter be described with reference to FIGS. 1 to 13.

A functional configuration of a work support apparatus according to the embodiment will be described with reference to FIG. 1.

Figure 1:
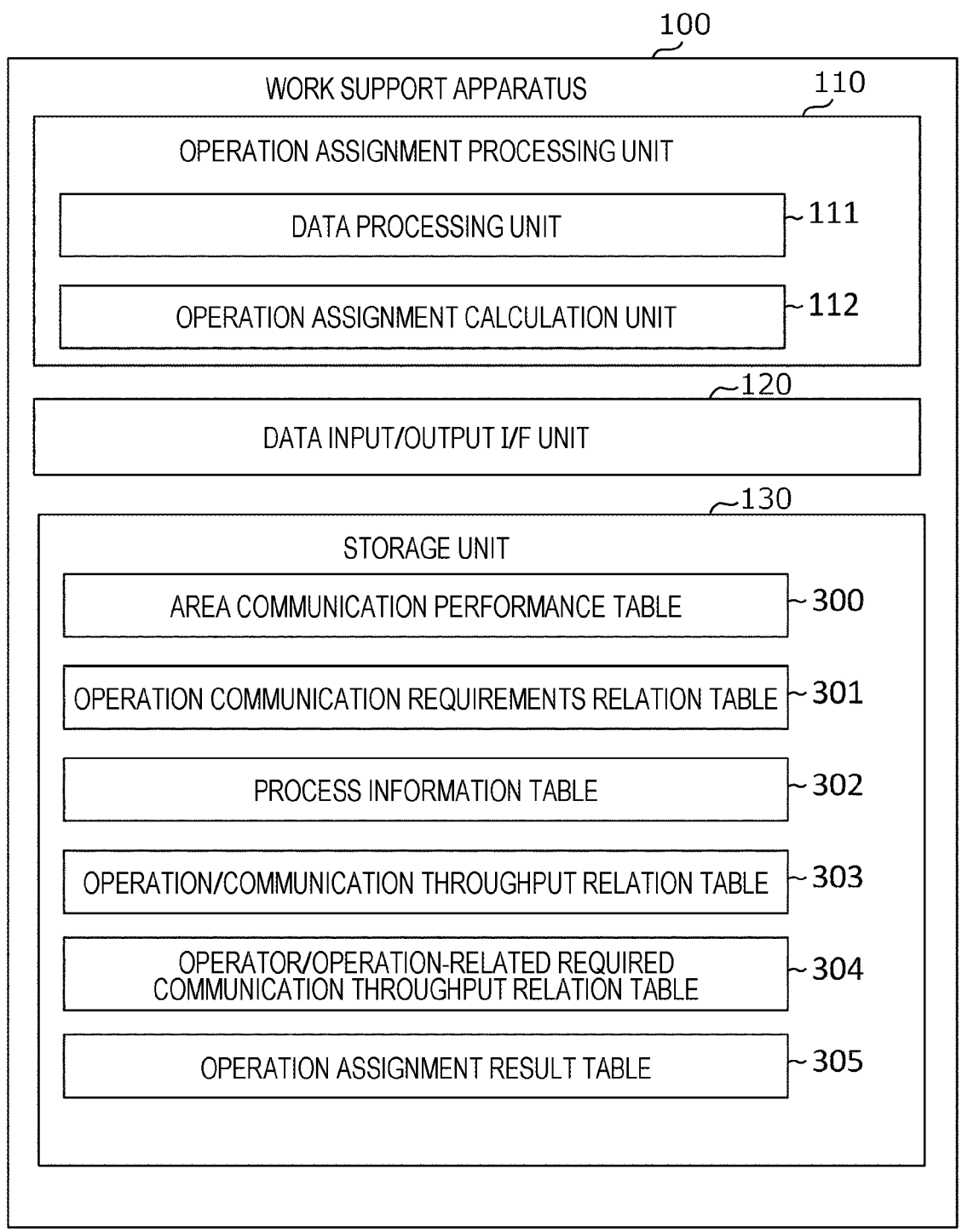
FIG. 1 is a block diagram of a functional configuration of a work support apparatus according to a first embodiment.

As shown in FIG. 1, a work support apparatus 100 includes an operation assignment processing unit 110, a data input/output I/F unit 120, and a storage unit 130, which work as functional units.

The operation assignment processing unit 110 is a processing unit that assigns an operator to an operation. The operation assignment processing unit 110 includes a data processing unit 111 and an operation assignment calculation unit 112, which are sub-function units. The data processing unit 111 is a functional unit that performs data processing as pre-processing before the processing by the operation assignment calculation unit 112. The operation assignment calculation unit 112 is a functional unit that performs a specific calculation to determine which operator is to be assigned to a specified operation, based on table data processed by the data processing unit 111.

The data input/output I/F unit 120 is a functional unit that outputs/receives data to/from an external device.

The storage unit 130 is a functional unit that stores/keeps data. The storage unit 130 of the work support apparatus 100 stores an area communication performance table 300, an operation communication requirements relation table 301, a process information table 302, an operation/communication throughput relation table 303, an operator/operation-related required communication throughput relation table 304, and an operation assignment result table 305.

A hardware/software configuration of a work support system will then be described with reference to FIG. 2.

Figure 2:
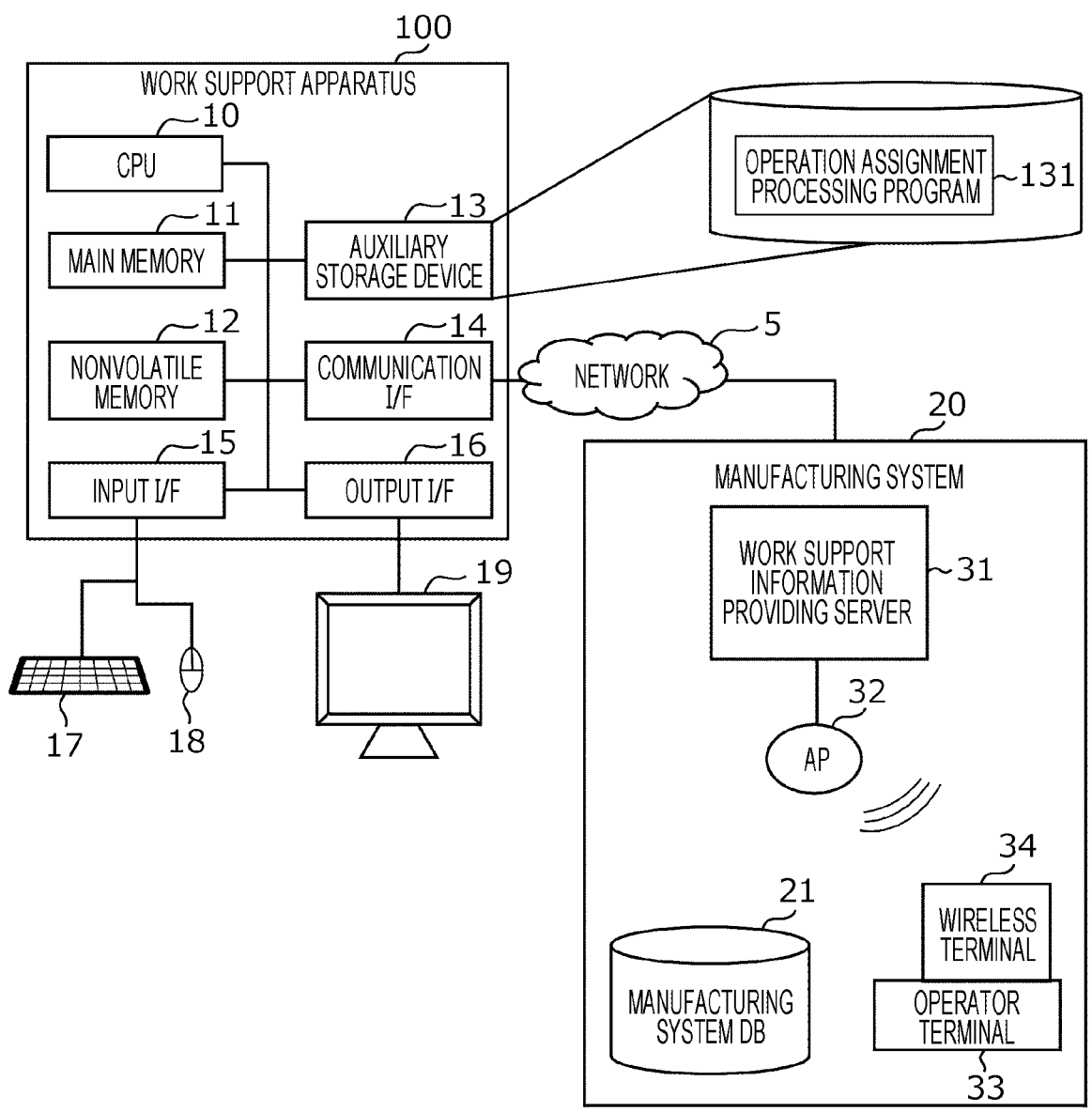
FIG. 2 is a block diagram of a hardware/software configuration of a work support system.

As shown in FIG. 2, the work support system of this embodiment is configured such the work support apparatus 100 is connected to a manufacturing system 20 through a network 5.

The manufacturing system 20 includes a manufacturing apparatus (not illustrated) that runs ordinary manufacturing, a data management server (not illustrated), and a manufacturing system DB 21 that is a database for manufacturing, and further includes a work support information providing server 31, an access point 32, an operator terminal 33, and a wireless terminal 34.

The work support information providing server 31 is a server that provides information about instructions, operation procedures, and the like to an operator who works at a workplace. The work support information providing server 31 and the access point 32 are connected by a wired means via a local area network (LAN). The operator terminal 33 has the wireless terminal 34, and the wireless terminal 34 and the access point 32 exchange data wirelessly according to, for example, the IEEE 802.11 b, g, n, or ac protocol. Wireless communication between the wireless terminal 34 and the access point 32 may carried out according to other wireless communication protocols, such as the long-term evolution (LTE) or 5th generation (5G).

The operator is able to perform an operation by looking at operation instructions and operation details displayed on the operator terminal 33 in the form of text, images, video, etc.

The manufacturing system 20 may be provided with a device that measures wireless environments at workplaces and that transmits data on wireless environments at various workplaces to a server of the manufacturing system 20. Using such data on wireless environments, information on communication of the manufacturing system DB 21 may be updated. The work support apparatus 100 may use information on communication of the manufacturing system DB 21.

The work support apparatus 100 may be provided as a general information processor, such as a personal computer. As shown in FIG. 2, the work support apparatus 100 includes a central processing unit (CPU) 10, a main memory 11, a nonvolatile memory 12, an auxiliary storage device 13, a communication I/F (interface) 14, an input I/F 15, and an output I/F 16, and various functions of the work support apparatus 100 are implemented when the CPU 10 executes various programs stored in the auxiliary storage device 13, which is, for example, an HDD.

The CPU 10 is a processing unit that executes a program loaded onto the main memory 11. A part of a process the CPU 10 executes by running a program may be executed by a different processing unit (e.g., field programmable gate array or FPGA). A program executed by the CPU 10 is stored in a removable medium, such as a DVD, or is provided to the work support apparatus 100 via the network 5 and is stored in the auxiliary storage device 13, which is a non-volatile, non-temporary storage medium. The work support apparatus 100, therefore, may include an I/F that reads data from a removable medium.

The main memory 11 is, for example, a high-speed, volatile semiconductor storage element, such as a dynamic random access memory (DRAM). The main memory 11 stores work data, and is loaded with a program installed in the auxiliary storage device 13 to keep the program temporarily.

The nonvolatile memory 12 is, for example, a read only memory (ROM), which is a nonvolatile semiconductor storage element. The nonvolatile memory 12 stores a program (e.g., BIOS) that cannot be rewritten in a normal situation.

The auxiliary storage device 13 is, for example, a large-capacity, nonvolatile storage device, such as a magnetic storage device (hard disk drive or HDD) or a flash memory (solid-state drive or SSD). The auxiliary storage device 13 stores data used by the CPU 10 upon its execution of a program and a program executed by the CPU 10.

Thus, a program is read out of the auxiliary storage device 13, is loaded onto the main memory 11, and is executed by the CPU 10 to implement each function of the work support apparatus 100.

An operation assignment processing program 131 is installed in the auxiliary storage device of this embodiment.

The operation assignment processing program 131 is a program that implements a function of the operation assignment processing unit 110.

A table shown in FIG. 1 is stored in the auxiliary storage device 13.

The communication I/F 14 controls communication with other devices, according to a predetermined protocol. For example, as shown in FIG. 2, the work support apparatus 100 communicates with the server of the manufacturing system via the network 5, using the communication I/F 14.

The input I/F 15 is an interface to which an input device, such as a keyboard 17 and a mouse 18, is connected. When a user operates the input device, the input I/F 15 receives input from the user via the input device.

The output I/F 16 is an interface to which an output device, such as a display 19 and a printer, is connected. The output I/F 16 outputs, for example, an operator ID assignment result to the output device in a form that is visually recognizable to the user (which will be described later).

The work support apparatus 100 is not limited to an apparatus that is physically configured as one computer, as shown in FIG. 2, and may be, for example, a computer system including a plurality of logically or physically configured computers, or may operate on, for example, a virtual computer built on multiple physical computer resources.

A relationship between communication and an operation process in a workplace, where an operator performs an operation, will then be described with reference to FIGS. 3 and 4.

Hereinafter, one divided section will be referred to as an area 203. According to this embodiment, a workplace is divided into 7 rows in a horizontal direction 201 and into 7 columns in a vertical direction 202 to be made up of 49 areas in total, as shown in FIG. 3. These areas are marked with A to G horizontally and with 00 to 06 vertically, and are managed with area IDs that are combinations of horizontal signs and vertical signs, according to which, for example, an area 203 is identified with an area ID "A-00".

One access point 32 or a plurality of them is set in the workplace, and the work support information providing server 31 transmits operation instructions, such as text, images, and video, and information on operation details, to the access point 32.

Figure 4:
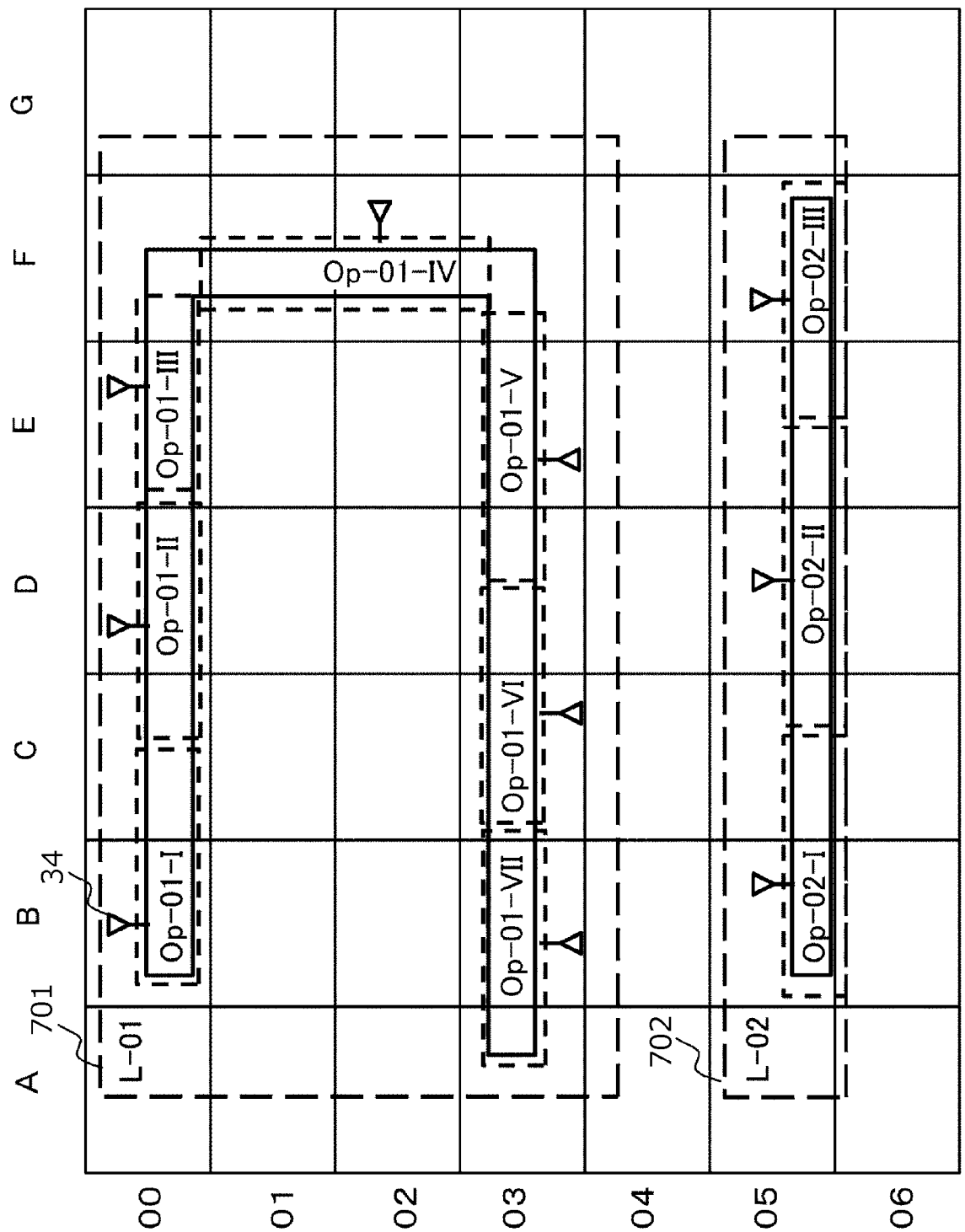
FIG. 4 depicts an example of a work layout.

An example of operation processes in the workplace is shown in FIG. 4.

The example of FIG. 4 shows that in a manufacturing process L-01, operations are performed in areas defined by area IDs "A to F" and "00 to 03", and that an operation with an operation ID "Op-01-I" is performed in an area with an area ID "B-00" and in a part of an area with an area ID "C-00" as the next operation with an operation ID "Op-01-II" is performed in a part of the area with the area ID "C-00" and in an area with an area ID "D-00". FIG. 4 also shows that the wireless terminal 34 of the operator terminal 33 is placed in the area with the area ID "B-00", the area with the area ID "D-00", and so forth.

FIG. 4 further shows that in a manufacturing process L-02, operations are performed in areas defined by area IDs "A to F" and "05".

Data structures used by the work support apparatus of the first embodiment will then be described with reference to FIGS. 5 to 10.

An area communication performance table 300 is a table that stores predicted communication performance in each area, and includes fields of area ID 300a and predicted communication throughput 300b, as shown in FIG. 5. The area ID 300a stores an ID for uniquely identifying each area shown in FIG. 3. The predicted communication throughput 300b stores upstream/downstream communication performance in an area indicated in the area ID 300a, showing, for example, upstream/downstream communication speeds [Mbps] effectively achieved in the area. FIG. 5 shows an example in which predicted communication speeds [Mbps] in upstream/downstream directions are stored in this field. Communication performance may be expressed by such an index as a communication packet delay time. In wireless communication, in general, throughput changes depending not only on a positional relationship between an access point and a wireless terminal but also on the number of wireless terminals communicating with the same access point, a change in the communication environment, etc. It is preferable, therefore, that the work support apparatus 100 be configured to measure throughput under various conditions in advance, thereby storing predicted communication throughput data for various conditions in a database and to select a predicted communication throughput value fit for a condition inputted to the work support apparatus 100, from the database.

An operation communication requirements relation table 301 is a table that stores specifications required for a communication environment in which a certain operator performs an operation. As shown in FIG. 6, the operation communication requirements relation table 301 includes fields of operator ID 301a, operator ID 301b, instruction method 301c, instruction interval 301d, image transmission interval 301e, and operator-requested communication throughput 301f. The operator ID 301a stores an ID for uniquely identifying an operator. The operation ID 301b stores an ID for uniquely identifying an operation performed by an operator. The instruction method field 301c stores an instruction method necessary for an operator to perform a certain operation. The instruction interval field 301d stores a proper instruction interval for issuing instructions for helping an operator perform a certain operation. The image transmission interval field 301e stores an image transmission interval in which a watcher (supervisor), who is responsible for checking whether a correct operation is carried out, photographs the status of an operator and sends an image of the operator to an analysis server. The operator-requested communication throughput 301f stores a communication throughput required of a system for helping an operator perform an operation, that is, a communication throughput required for communication between a display device that displays instructions to the operator and a server that transmits instruction information, and a communication throughput required for sending an image to a server that analyzes the image.

A process information table 302 is a table that stores information on a manufacturing process. As shown in FIG. 7, the process information table 302 includes fields of process ID 302a, start time 302b, end time 302c, operation ID 302d, apparatus ID 302e, and apparatus installation area ID 302f. The process ID 302a stores an ID for uniquely identifying a process. The start time field 302b stores a time to start a process. The end time field 302c stores the time to end a process. The work ID 302d stores an ID for uniquely identifying an operation included in a process. The apparatus ID 302e stores an ID for uniquely identifying an apparatus used in a process. Apparatuses used in the process include an apparatus directly used for manufacturing, such as a processing machine and a robot, and include also a display device for displaying operation instructions to an operator and a camera for photographing the operator's status. FIG. 7 shows the process information table 302 including the start time field 302b and the end time field 302c, but the process information table 302 may not include these fields.

The apparatus installation area ID 302f stores an area ID for an area in which a communication device for communicating with a device needed to perform the operation indicated by the corresponding operation ID is installed. For example, when a display device, a camera, or the like wirelessly communicates with a server, an area ID for an area in which a wireless device is installed is entered as an apparatus installation area ID.

For example, according to the operation layout shown in FIG. 4, in the manufacturing process L-01: 701, the area ID "B-00" for the area where the wireless terminal 34 is installed is the apparatus installation area ID corresponding to the operation with the work ID "Op-01-I".

Figure 8:
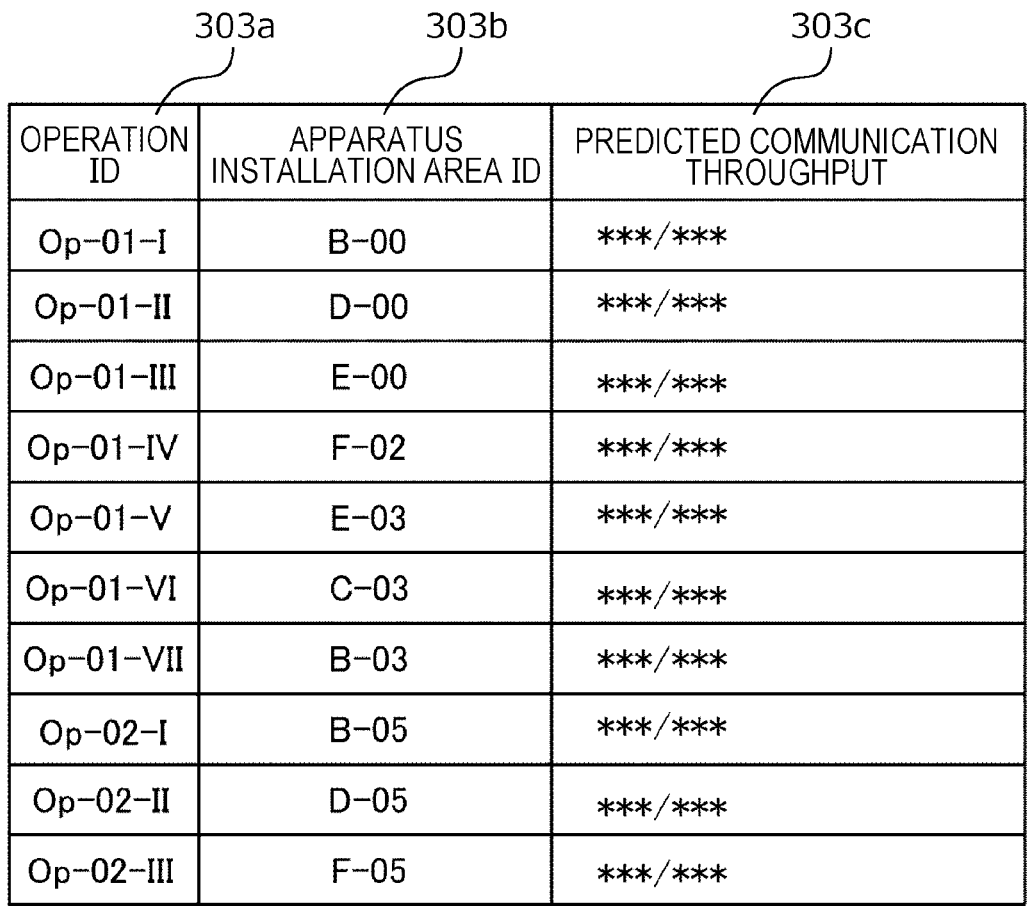
FIG. 8 depicts an example of an operation/communication throughput relation table.

An operation/communication throughput relation table 303 is a table that stores a relationship between an operation and a communication throughput. As shown in FIG. 8, the operation/communication throughput relation table 303 includes fields of operation ID 303a, apparatus installation area ID 303b, and predicted communication throughput 303c. The operation ID 303a stores an operation ID for uniquely identifying an operation. The apparatus installation area ID 303b stores an area ID in which a communication device for communicating with a device needed to perform the operation identified by the operation ID is installed. The predicted communication throughput 303c stores the value of an effective upstream/downstream communication throughput that is predicted as a throughput in an area in the apparatus installation area ID 303b.

An operator/operation-related required communication throughput relation table 304 is a table that stores a relationship between an operation and a communication throughput required for each operator. As shown in FIG. 9, the operator/operation-related required communication throughput relation table 304 includes fields of operation ID 304a, operator ID 304b, and operator-requested communication throughput 304c. The operation ID 304a stores an ID for uniquely identifying an operation. The operator ID 304b stores an ID for uniquely identifying an operator who performs the operation identified by the operation ID. The operator-requested communication throughput 304c stores the value of a communication throughput that is required when the operator performs the operation.

An operation assignment result table 305 is a table that stores a result of assignment of an operation to an operator. As shown in FIG. 10, the operation assignment result table 305 includes fields of operation ID 305a and operator ID 305b. The operation ID 305a stores an operation ID for uniquely identifying an operation. The operator ID 305b stores an ID for uniquely identifying an operator to whom the operation identified by the operation ID is assigned.

A process carried out by the work support apparatus will then be described with reference to FIGS. 11 and 12.

First, information on a manufacturing process and on an operator who engages in an operation in the manufacturing process (operator ID) is input to the work support apparatus 100 (S101). The inputted information on the manufacturing process is stored in the process information table 302 shown in FIG. 7.

Subsequently, the data processing unit 111 of the operation assignment processing unit 110 of the work support apparatus 100 extracts entry values of the operation ID 302d and the apparatus installation area ID 302f of the process information table 302, respectively. The data processing unit 111 extracts also a throughput value of the predicted communication throughput 300b, the throughput value corresponding to an area ID (entry value) of the apparatus installation area ID 302f, from the area communication performance table 300 shown in FIG. 5. At this step, the area communication performance table 300 fit for input conditions is selected, and a predicted communication throughput value is extracted from the selected area communication performance table 300. The data processing unit 111 then sets values in the operation ID 303a, the apparatus installation area ID 303*b*, and the predicted communication throughput 303*c* of the operation/communication throughput relation table 303 shown in FIG. 8, respectively (S102).

Subsequently, the data processing unit 111 extracts the inputted operator ID and an operation ID value of the operation ID 302*d* of the process information table 302. The data processing unit 111 then sets values in the operation ID 304*a*, the operator ID 304*b*, and the operator-requested communication throughput 304*c* of the operator/operation-related required communication throughput relation table 304 of FIG. 9, respectively, referring to the operation communication requirements relation table 301 shown in FIG. 6 (S103).

Subsequently, the operation assignment calculation unit 112 of the operation assignment processing unit 110 carries out an operation assignment calculation process (S104). Details of the operation assignment calculation process will be described later with reference to FIG. 12.

Subsequently, the data input/output I/F 120 of the work support apparatus 100 outputs a result of the work assignment calculation process (S105). A user interface related to output of the result of the operation assignment calculation process will be described later.

Details of the operation assignment calculation process will then be described with reference to FIG. 12.

Figure 11:
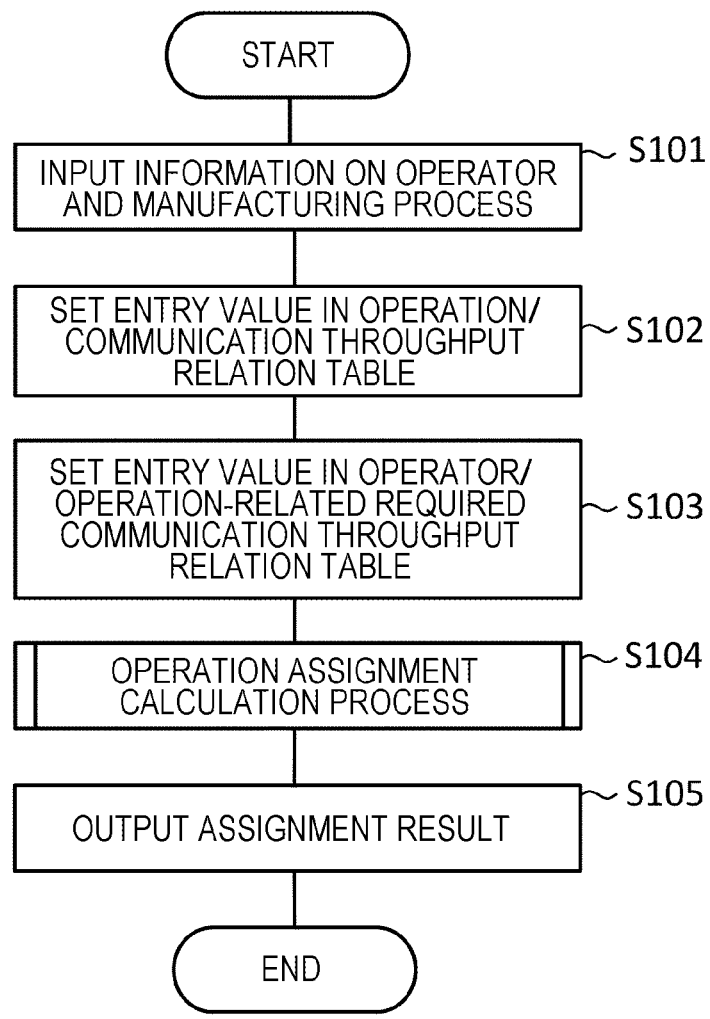
FIG. 11 is a flowchart showing processing of assigning an operator to an operation by the work support apparatus (No. 1)

This process corresponds to S104 of FIG. 11.

An operation ID list (not illustrated) is created, in which operation IDs are sorted in the order of smaller throughput values of the predicted communication throughput 303*c* of the operation/communication throughput relation table 303 shown in FIG. 8 (S201). Predicted communication throughputs described in this embodiment consist of two types of communication throughputs, i.e., upstream communication throughputs and downstream communication throughputs. When these communication throughputs are sorted in the order of smaller throughputs, which of the upstream communication throughput and the downstream communication throughput is to serve as a reference for sorting may be determined such that either of the upstream communication throughput and the downstream communication throughput that is considered to be important one by the operator is selected as the reference or such that an average of both communication throughputs is calculated to use the average as the reference for sorting.

Subsequently, an operation ID for which the predicted communication throughput is the minimum, the operation ID having not been extracted from the created operation ID list, is selected (S202). When a plurality operation IDs for which the predicted communication throughput is the minimum are presents, for example, a smaller ID is selected.

Subsequently, from operator IDs for operators not having operation assignment yet, the operator IDs being included in the operator/operation-related required communication throughput relation table 304, an operator ID for which the throughput value of the operator-requested communication throughput 304*c* is the minimum is selected for the operation ID selected at step S202 (S203). At this time, a reference for taking the minimum of the upstream/downstream values is the same as the reference for sorting predicted communication throughputs in the order of smaller throughputs. When a plurality of operator IDs for which the throughput value of the operator-requested communication throughput 304*c* is the minimum are present, for example, a small ID is selected.

Assigning the operator ID (operator) selected at S203 to the operation ID (operation) is determined (S204), and a combination of the operator ID and the operation ID is stored in the main memory 11 (S205).

Then, the operation ID to which the operator has been assigned is deleted from the operation ID list (S206).

Subsequently, whether an operator ID is present in the operator ID list is determined (S207). When no operator ID is present in the ID list (S207: No), a result of assignment of operator IDs to operation IDs stored in the main memory 11 is set in the operation assignment result table 305 shown in FIG. 10 (S208), and the whole process comes to an end. When an operator ID remains in the operator ID list (S207: Yes), the process flow returns to S202, and a loop of S202 to S207 is repeated.

The user interface related to output of a result of the operation assignment calculation process will then be described with reference to FIG. 13.

Figure 13:
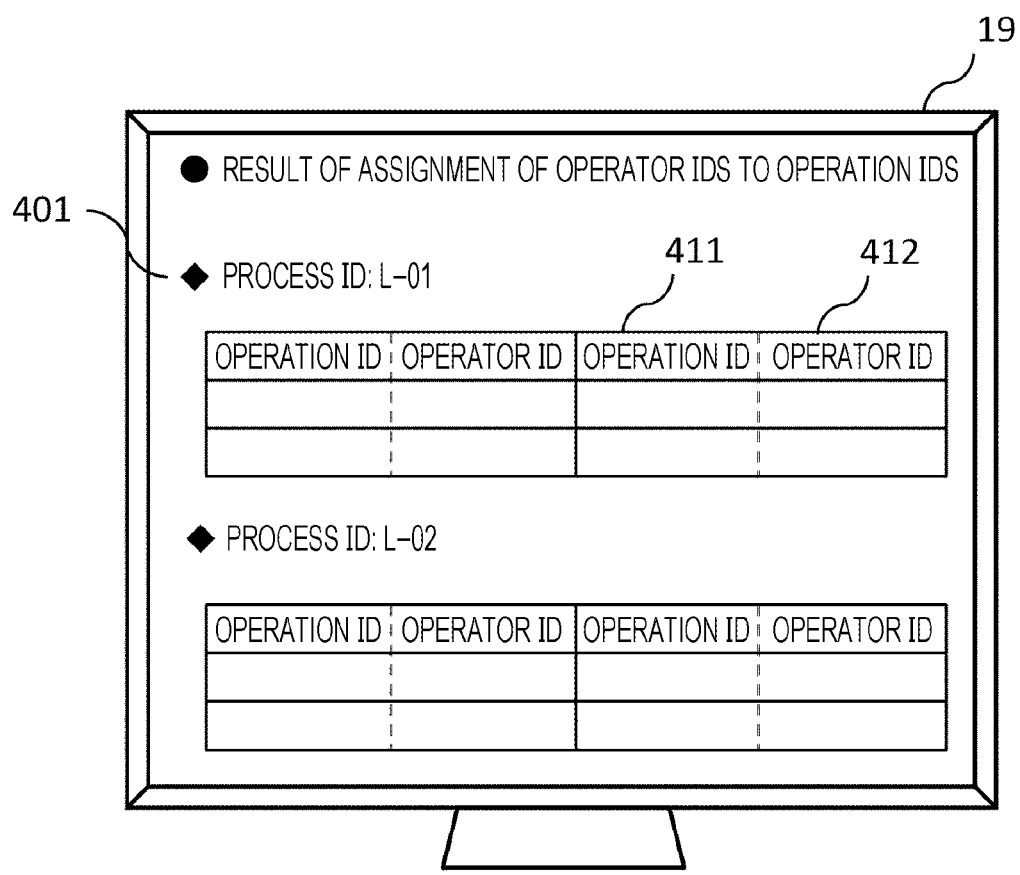
FIG. 13 depicts an example of an operation assignment result screen.

On an operation assignment result screen 400, which is displayed on the display 19, an operation assignment correspondence table 401 having an operation ID display column 411 and an operator ID display column 412 corresponding thereto is displayed for each process, as shown in FIG. 13. This allows a person who sets an operation plan in a manufacturing process to know which operator is to be assigned to an operation. On the operation assignment correspondence table 401, additional information, such as names, may also be displayed.

According to the operation assignment process of this embodiment, operator IDs are determined in the order in which an operator ID for an operation ID with a smaller predicted communication throughput is first. This procedure allows operator assignment such that to an operation carried out in a workplace where communication performance is low, an operator who requires less operator-requested communication throughput, that is, who is considered to be one skilled in the operation can be assigned. Thus, an operator can be assigned to an operation so that in actual execution of the operation, the operator is provided with information fit for the operator in consideration of a system communication environment.

According to the assignment procedure described above, the operator ID with the minimum operator-requested communication throughput is selected. A different assignment procedure, however, may also be adopted, according to which a predicted communication throughput for an operation ID and an operator-requested communication throughput are expressed as the same indexes to allow comparison of both throughputs, operator IDs for which the operator-requested communication throughput is smaller than the predicted communication throughput for the operation ID are extracted as assignment candidates, and an operator ID is selected out of the assignment candidates as assignment of an operator ID to other operation IDs is taken into consideration. This assignment procedure, compared with the assignment procedure of selecting the operator ID with the minimum operator-requested communication throughput, offers a higher possibility that the number of operator IDs for operators to whom the operator-requested communication throughput can be provided for an operation (operation ID) to which the operator is assigned can be increased. This means that the number of operators who are given operation instructions necessary for performing an operation can be increased.

Contrary to the above case, when operator assignment needs to be carried out in such a way as to give necessary operation instructions to an operator not skilled in an operation to allow the operator to become skilled in the operation, an operator ID for which the operator-requested communication throughput is the maximum may be assigned to an operation ID among operation IDs for operations performed in an apparatus installation area where the predicted communication throughput is large. It can be said that this is an operation assignment procedure focusing on training an operator not skilled in an operation.

As described above, according to this embodiment, preferable work support is provided to allow proper assignment of an operator to an operation in a case where communication necessary for allowing an operator to correctly perform an operation in a manufacturing process, that is, necessary for providing operation instructions and support is made by a wireless means and communication for controlling an apparatus used for the operation, such as a processing machine, is made by a communication method different from the communication method for work support, for example, made by wireless communication or wired communication different from the communication method for work support.

Second Embodiment

A second embodiment according to the present invention will hereinafter be described with reference to FIG. 14 to FIG. 25.

In the first embodiment, the work support apparatus has been described, which is installed in a workplace and assigns an operator to an operation in consideration of wireless communication necessary for giving the operator operation instructions and operation support.

It is a precondition that the second embodiment is applied to the same system as described in the first embodiment. The second embodiment is, however, particularly effective for a case where communication for controlling such an apparatus as a processing machine is made through the same communication network as used for communication for work support, particularly through a wireless communication network, and communication throughput for controlling such an apparatus as a processing machine also needs to be taken into consideration. In the following description, differences from the first embodiment will mainly be explained.

Figure 14:
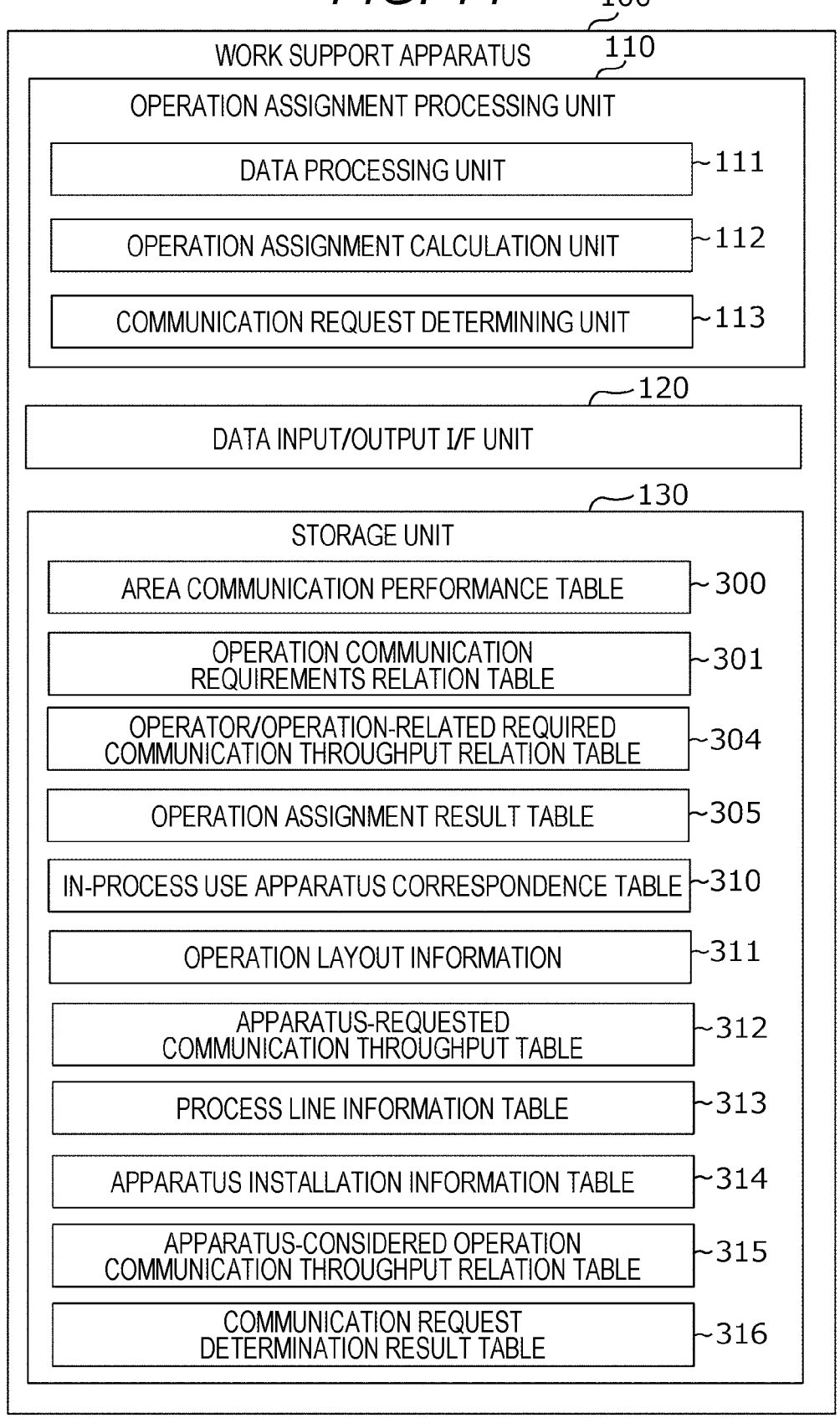
FIG. 14 is a block diagram of a functional configuration of a work support apparatus according to a second embodiment.

A functional configuration of a work support apparatus according to the second embodiment will first be described with reference to FIG. 14.

In a work support apparatus 100 according to the second embodiment, the operation assignment processing unit 110 of the first embodiment further includes a communication request determining unit 113.

The storage unit stores the area communication performance table 300, the operation communication requirements relation table 301, the operator/operation-related required communication throughput relation table 304, and the operation assignment result table 305, and further stores an in-process use apparatus correspondence table 310, operation layout information 311, an apparatus-requested communication throughput table 312, a process line information table 313, an apparatus installation information table 314, an apparatus-considered operation communication throughput relation table 315, and a communication request determination result table 316. Tables used for the first time in the second embodiment will be described in detail later.

Figure 15:
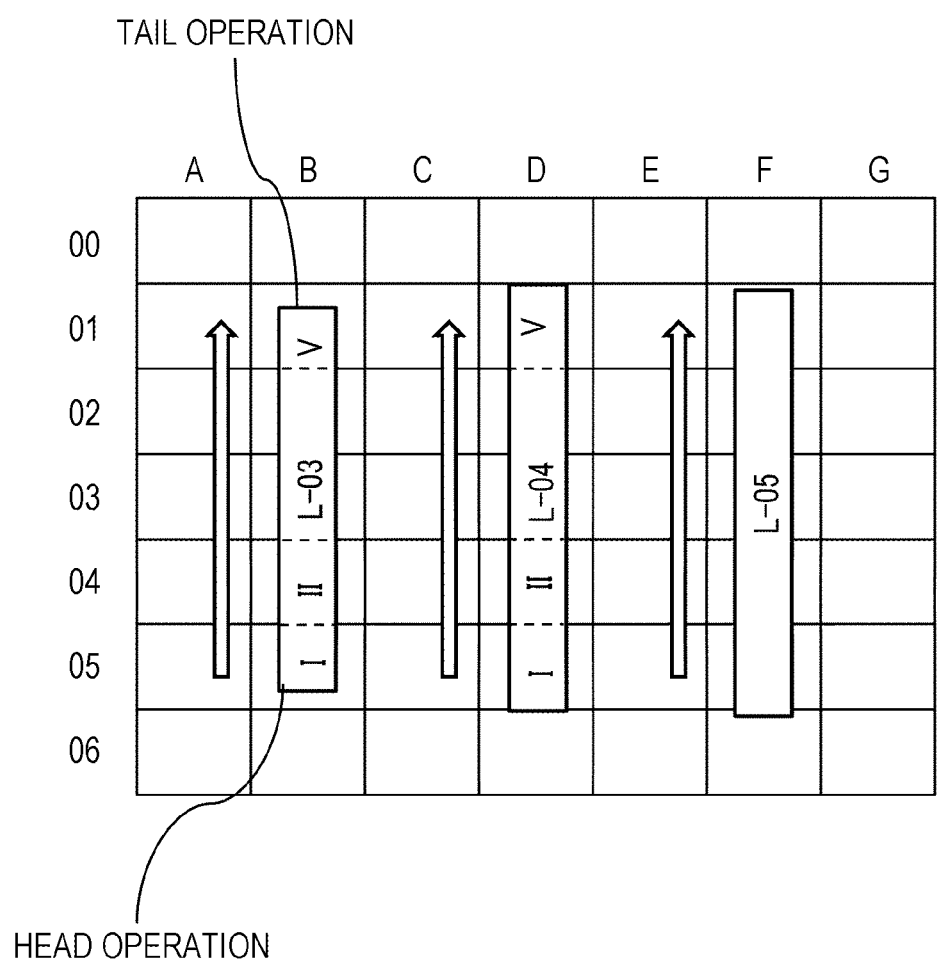
FIG. 15 is a diagram for explaining a relationship between operation processes in a workplace where an operator performs an operation.

A relationship between operation processes in a workplace where an operator performs operations will then be described with reference to FIG. 15.

Figure 3:
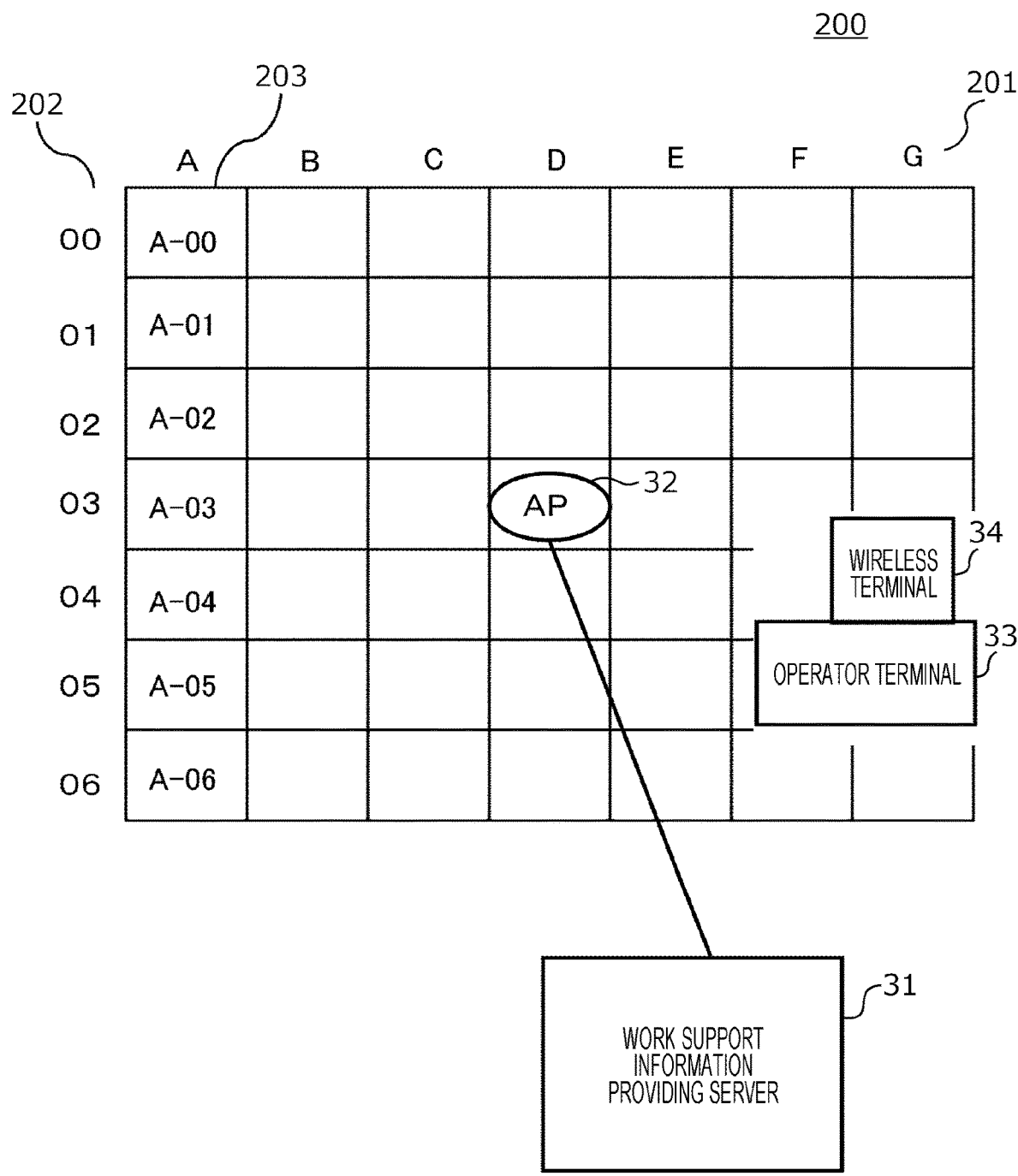
FIG. 3 depicts an example in which a workplace where an operation is performed in a manufacturing process is divided into a plurality of areas.

According to the second embodiment, in the same manner as in FIG. 3 of the first embodiment, the workplace is divided into areas, which are managed according to their area IDs. In this embodiment, processes and areas are related to each other such that, for each process, an area where the first operation (hereinafter, "head operation") is performed and an area where the last operation (hereinafter, "tail operation") is performed are specified, as shown in FIG. 15. In the example of FIG. 15, for example, in a process "L-03", an area ID for an area where the head operation is performed is "B-05" while an area ID for an area where the tail operation is performed is "B-01".

Data structures used by the work support apparatus of the second embodiment will then be described with reference to FIG. 16 to FIG. 22.

The in-process use apparatus correspondence table 310 is a table that stores information on a process, an operation belonging to the process, and an apparatus used in the operation. As shown in FIG. 16, the in-process use apparatus correspondence table 310 includes fields of process ID 310$a$, operation ID 310$b$, and apparatus ID 310$c$.

The process ID 310$a$ stores an ID for uniquely identifying a process. The operation ID 310$b$ stores an ID for uniquely identifying an operation belonging to a process indicated in the process ID 310$a$. The apparatus ID 310$c$ stores an ID for uniquely identifying an apparatus used in an operation.

Figure 17:
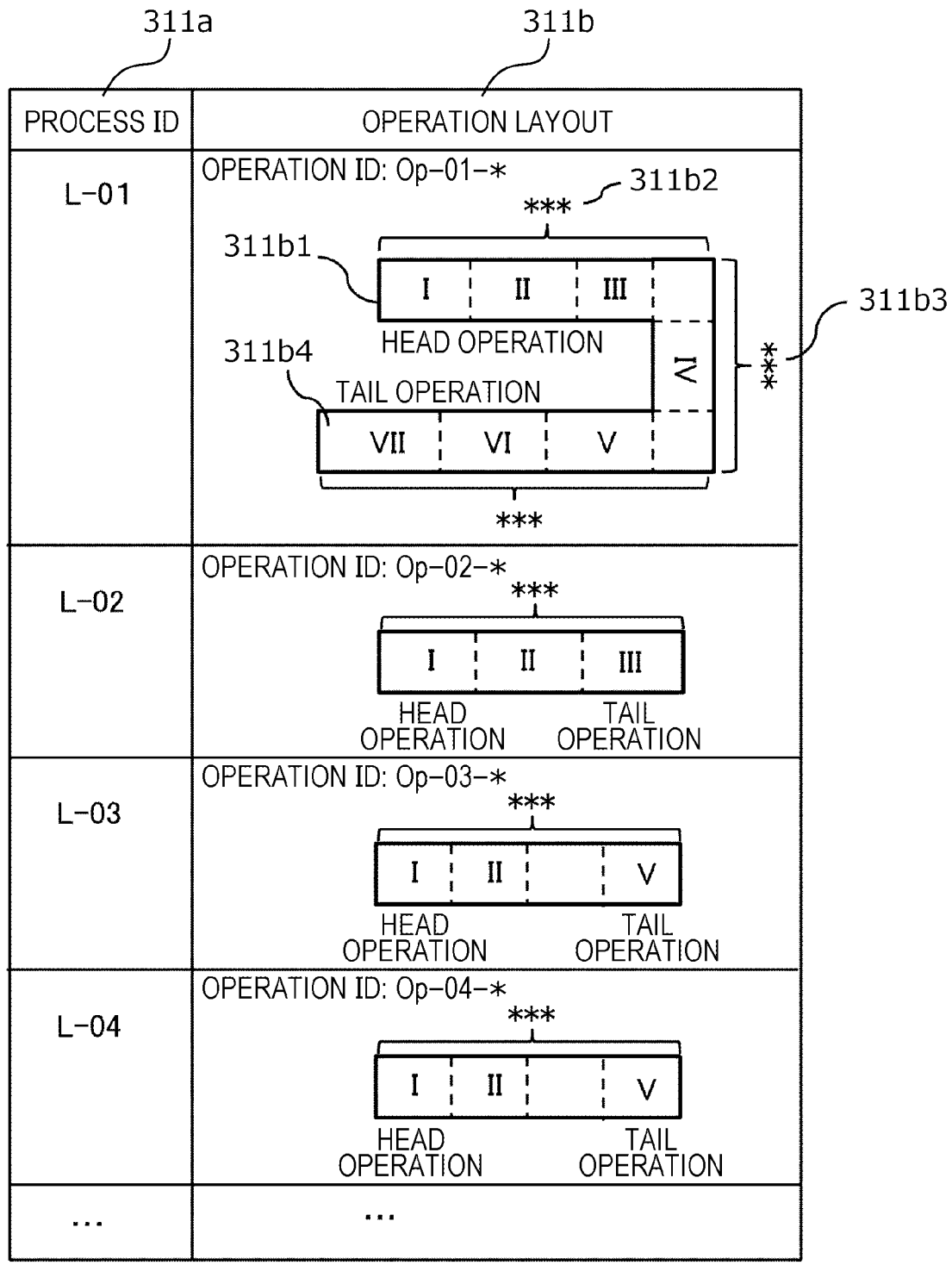
FIG. 17 depicts an example of an operation layout information.

The operation layout information 311 is information on an operation layout of each process. As shown in FIG. 17, the operation layout information 311 includes fields of process ID 311$a$ and operation layout 311$b$. The process ID 311$a$ stores an ID for uniquely identifying a process. The operation layout field 311$b$ stores information on the layout of a process identified by a process ID. The operation layout field 311$b$ includes descriptions of a head work 311$b$1, an operation arrangement order 311$b$2, space-related information 311$b$3, and a tail operation 311$b$4. The operation arrangement order 311$b$2 is information indicating operations performed in order, such as (I→II→III→ . . . ). The head operation 311$b$1 is information indicating the area ID for the head operation. The tail operation 311$b$4 is information indicating the area ID for the tail work. The space-related information 311$b$3 is, for example, supplementary information on a space for an operation, such as "Operation area for IV is *** m".

The apparatus-requested communication throughput table 312 is a table that stores information on a communication throughput that is needed for an apparatus at execution of each operation. As shown in FIG. 18, the apparatus-requested communication throughput table 312 includes fields of apparatus ID 312$a$, and apparatus-requested communication throughput 312$b$ (which has sub-fields of operator dependency 312$b$1 and upstream/downstream throughput 312$b$2). The apparatus ID 312$a$ stores an ID uniquely identifying an apparatus. The apparatus-requested communication throughput 312$b$ stores information on a communication throughput when an operation is performed using an apparatus indicated in the apparatus ID 312$a$. The operator dependency field 312$b$1 stores a flag indicating whether a communication throughput changes depending on an operator who performs the operation using the apparatus. In this embodiment, for example, apparatuses used for an operation include a camera that photographs the operation performed by an operator, and a display device that displays instructions to the operator. The communication throughput of such a camera or a display device may change depending on an operator engaging in an assigned operation. Specifically, when an operator needs detailed instruction information, e.g., instruction information shown in a high-definition image, communication throughput from the server to the display device becomes greater than a case of an operator for whom instruction information in the form of text is enough.

In another case where an operator's operation needs to be checked frequently for such a reason as the operator's insufficient experience in the operation, images of the operator's operation are sent to the server more frequently than in a case of an operator who has much experience in the operation. This, therefore, results in an increase in communication throughput. In such a case, "Exist" is entered in the operator dependency field 312b1. In a case of an apparatus that merely processes a target object, that is, a case where a communication throughput needed for the apparatus does not change depending an operator, on the other hand, "Not exist" is entered in the operator dependency field 312b1. When the entry value of the operator dependency field 312b1 is "Not exist", upstream/downstream throughputs are entered in the upstream/downstream throughput 312b2. When the entry value of the operator dependency field 312b1 is "Exist", on the other hand, "change depending on operation ID" is entered in the upstream/downstream throughput 312b2.

The process line information table 313 is a table that stores a relationship between the head operation and the tail operation in a process. As shown in FIG. 19, the process line information table 313 includes fields of process ID 313a, head operation area ID 313b, and tail operation area ID 313c. The process ID 313a stores an ID uniquely identifying a process. The head operation area ID 313b stores the area ID for the head operation of the process. The tail operation area ID 313c stores the area ID for the tail operation of the process.

The apparatus installation information table 314 is a table that stores information on an apparatus used for an operation. As shown in FIG. 20, the apparatus installation information table 314 includes fields of process ID 314a, operation area ID 314b, operation ID 314c, and apparatus ID 314d. The process ID 314a stores an ID uniquely identifying a process. The operation area ID 314b stores an area ID for an area where an operation belonging to the process is performed. The operation ID 314c stores an ID for uniquely identifying an operation belonging to the process. The apparatus ID 314d stores an ID uniquely identifying an apparatus used for the operation.

The apparatus-considered operation communication throughput relation table 315 is a table that stores information on an operation communication throughput whose change depending on the characteristics of an apparatus is taken into consideration. As shown in FIG. 21, the apparatus-considered operation communication throughput relation table 315 includes fields of operation area ID 315a, predicted communication throughput 315b, operation ID 315c, non-operator-dependent apparatus-requested communication throughput 315d, and operator communication throughput 315e. The operation area ID 315a stores an area ID for an area where an operation is performed. The predicted communication throughput 315b stores a communication throughput that is predicted in the area indicated in the operation area ID 315a. The operation ID 315c stores an ID uniquely identifying the operation performed. The non-operator-dependent apparatus-requested communication throughput 315d stores a communication throughput that an apparatus used in the area requires, regardless of the operator. The operator communication throughput 315e stores an entry value given by subtracting the entry value of the non-operator-dependent apparatus-requested communication throughput 315d from the entry value of the predicted communication throughput 315b. The operator communication throughput 315e indicates a throughput that can be allocated to communication made for giving instructions to the operator or confirming the operator's operation. When a plurality of apparatuses with required communication throughput not depending on an operator are present, the entry value of the non-operator-dependent apparatus-requested communication throughput 315d is a sum of the communication throughputs of those apparatuses.

The communication request determination result table 316 is a table that stores a result of determination on whether a communication throughput in an area where an operation is performed is sufficient when an operator is assigned to the operation. As shown in FIG. 22, the communication request determination result table 316 includes fields of operation ID 316a, operator ID 316b, and communication request determination result 316c. The operation ID 316a stores an ID uniquely identifying an operation. The operator ID 316b stores an ID uniquely identifying an operator who performs the operation. The communication request determination result 316c stores a flag indicating a result of determination on whether a communication throughput for performing the operation indicated in the operation ID 316a is sufficient when the operator indicated in the operator ID 316b performs the operation.

A process carried out by the work support apparatus will then be described with reference to FIGS. 23 and 24.

First, information on a manufacturing process and on an operator who engages in an operation in the manufacturing process (operator ID) is input to the work support apparatus 100 (S301). The inputted information on the manufacturing process is stored in the in-process use apparatus correspondence table 310 shown in FIG. 16, in the operation layout information 311 shown in FIG. 17, and in the process line information table 313 shown in FIG. 19.

Subsequently, the data processing unit 111 of the operation assignment processing unit 110 of the work support apparatus 100 extracts the area ID for the head operation and the same for the tail operation, the head and tail operations belonging to each process, from the process ID 313a, the head operation area ID 313b, and the tail operation area ID 313c of the process line information table 313, and associates an operation area ID with each operation belonging to the process, referring to the operation layout information 311. Based on a result of this step, the data processing unit 111 then sets entry values in the process ID 314a, the operation area ID 314b, the operation ID 314c, and the apparatus ID 314d of the apparatus installation information table 314 of FIG. 20, respectively, referring to the in-process use apparatus correspondence table 310 (S302).

Subsequently, the data processing unit 111 extracts the entry value of the operation area ID 314b of the apparatus installation information table 314, and extracts a predicted communication throughput from the area communication performance table 300 of FIG. 5, the predicted communication throughput corresponding to the entry value, i.e., an operation area. At this step, in the same manner as in the first embodiment, a predicted communication throughput value set in the area communication performance table 300 fit for input conditions is extracted.

Further, the data processing unit 111 extracts an upstream/downstream throughput value corresponding to an apparatus indicated in the apparatus ID 314d of the apparatus installation information table 314 and to the entry value "Not exist" of the operator dependency field 312b1 of the apparatus-requested communication throughput 312b, from the apparatus-requested communication throughput table 312 shown in FIG. 18, and, using the extracted information, sets entry values in the operation area ID 315a, the predicted communication throughput 315b, the operation ID 315c, the non-operator-dependent apparatus-requested communication throughput 315d, and the operator communication throughput 315e of the apparatus-considered operation communication throughput relation table 315 shown in FIG. 21, respectively (S303).

As described above, the entry value of the operator communication throughput field 315e is a communication throughput that can be used for communication made for giving the operator instructions or confirming the operator's operation, and is calculated by subtracting the entry value of the non-operator-dependent apparatus-requested communication throughput 315d from the entry value of the predicted communication throughput 315b.

The data processing unit 111 then extracts the operator ID inputted at step S301 and a process ID indicated in the process ID 313a of the process line information table 313 shown in FIG. 19, and, in the same manner as in the first embodiment, sets entry values in the operator/operation-related required communication throughput relation table 304 shown in FIG. 9, referring to the in-process use apparatus correspondence table 310 shown in FIG. 16 and the operation communication requirements relation table 301 shown in FIG. 6 (S304).

Subsequently, referring to the entry values of the apparatus-considered operation communication throughput relation table 315 that are set at S303 and the entry values of the operator/operation-related required communication throughput relation table 304 that are set at S304, the communication request determining unit 113 of the operation assignment processing unit 110 performs communication request determination processing (S305). Details of the communication request determination processing will be described later.

Subsequently, the data input/output I/F 120 of the work support apparatus 100 outputs a result of the communication request determination processing (S306). A user interface related to output of the result of the communication request determination processing will be described later.

The details of the communication request determination processing will then be described with reference to FIG. 24.

Figure 23:
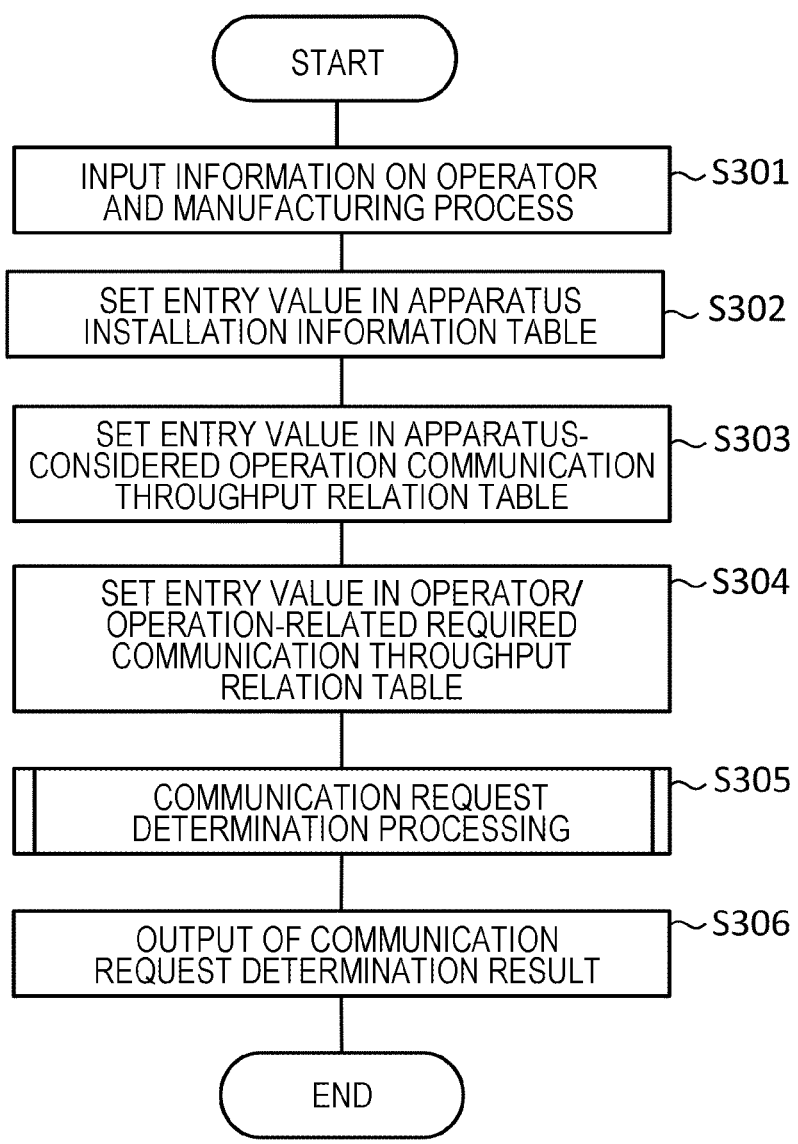
FIG. 23 is a flowchart showing processing of assigning an operator to an operation by the work support apparatus (No. 2)

This process corresponds to step S305 of FIG. 23.

Figure 12:
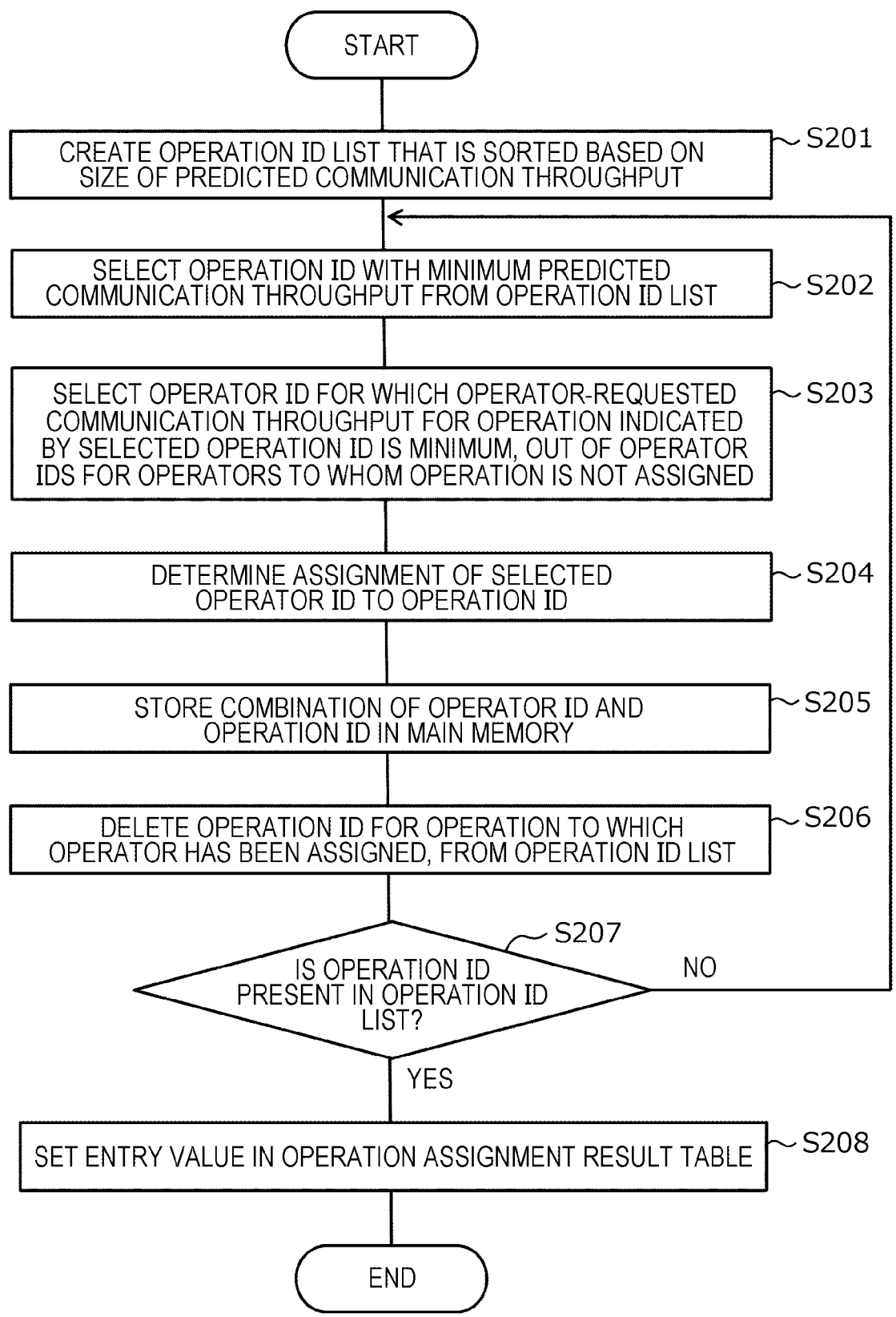
FIG. 12 is a flowchart showing details of an operation assignment calculation processing.

First, the communication request determining unit 113 calls the operation assignment calculation unit 112, and carries out the same process as the operation assignment calculation process shown in FIG. 12 of the first embodiment (S401).

In the first embodiment, the operation ID list is created from the operation/communication throughput relation table 303 shown in FIG. 8. In the second embodiment, on the other hand, the operation ID list is created from the apparatus-considered operation communication throughput relation table 315 shown in FIG. 21. In the first embodiment, the operation ID list that is sorted based on the size of predicted communication throughputs is created and an operation ID with the minimum predicted communication throughput is selected from the operation ID list to assign an operator ID to the selected operation ID. In the second embodiment, on the other hand, an operation ID list that is sorted based on the size of operator communication throughputs is created and an operation ID with the minimum operator communication throughput is selected from the operation ID list to assign an operator ID to the selected operation ID.

Subsequently, the communication request determining unit 113 refers to the operation assignment result table 305 shown in FIG. 10, and for each operation ID indicated in the operation assignment result table 305, compares the entry value of the operator communication throughput 315e indicated in the apparatus-considered operation communication throughput relation table 315 shown in FIG. 21 with the entry value of the operator-requested communication throughput 304c indicated in the operator/operation-related required communication throughput relation table 304 shown in FIG. 9 (S402), and sets values in the operation ID 316a, the operator ID 316b, and the communication request determination result 316c in the communication request determination result table 316 shown in FIG. 22, respectively, according to a setting rule that "OK" (proper) is entered when operator communication throughput≥operator-requested communication throughput holds, while "NG" (improper) is entered when operator communication throughput<operator-requested communication throughput holds (S403).

The user interface related to output of the result of the communication request determination process will then be described with reference to FIG. 25.

On a communication request determination result screen 500, a determination result table 501 is displayed. The determination result table 501 includes a process ID display column 501a, an operator ID display column 501b, an operator ID display column 501c, and a communication request determination result display column 501d, in which, for each process ID, the corresponding entry values of the communication request determination result table 316 of FIG. 22 are displayed, respectively.

As described above, according to this embodiment, even when the same communication network used for communication for operation support is used for communication for control of an apparatus, an operator can be assigned properly to an operation in accordance with communication throughput for operation support.

Figure 25:
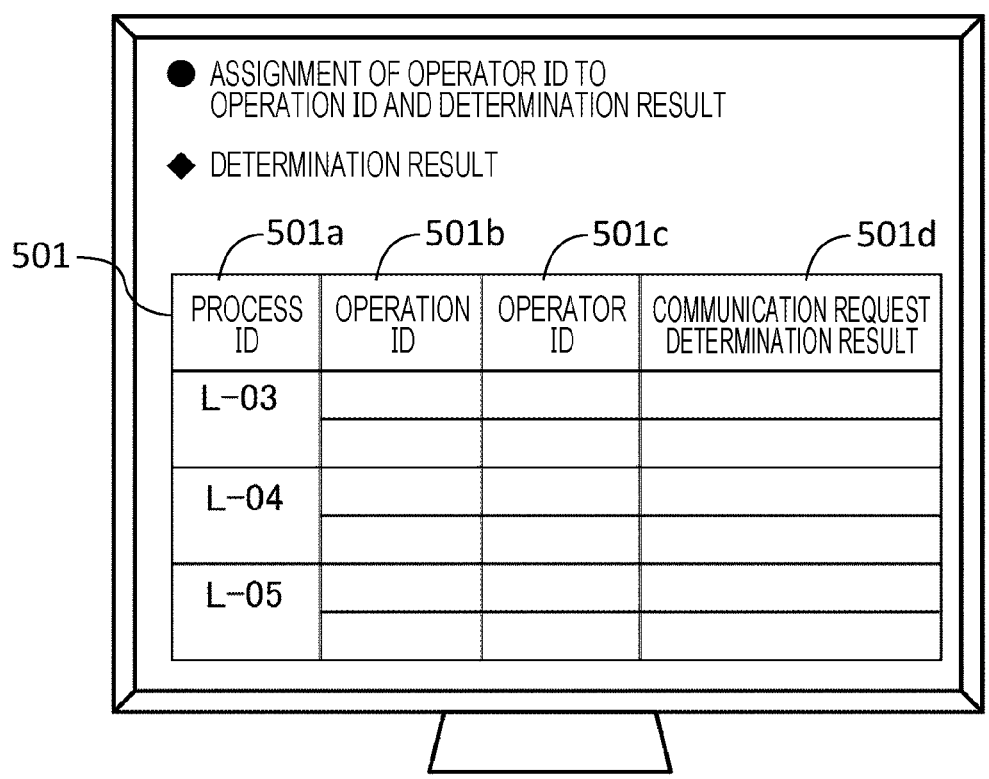
FIG. 25 depicts an example of a communication request determination result screen (No. 1)

As described in this embodiment, the operator communication throughput and the operator-requested communication throughput are compared with each other and the result of comparison is outputted as a communication request determination result as shown on the communication request determination result screen 500 of FIG. 25. This allows an operation supervisor who supervises processes using the work support apparatus 100 to know whether instructions needed for an operator to perform an assigned operation can be provided or not. When the determination result indicates that the instructions needed for the operator cannot be provided, the operation supervisor is able to discuss replacement of the operator or improvement of the communication environment of the operation area.

Third Embodiment

A third embodiment according to the present invention will hereinafter be described with reference to FIG. 26 to FIG. 29.

Figure 24:
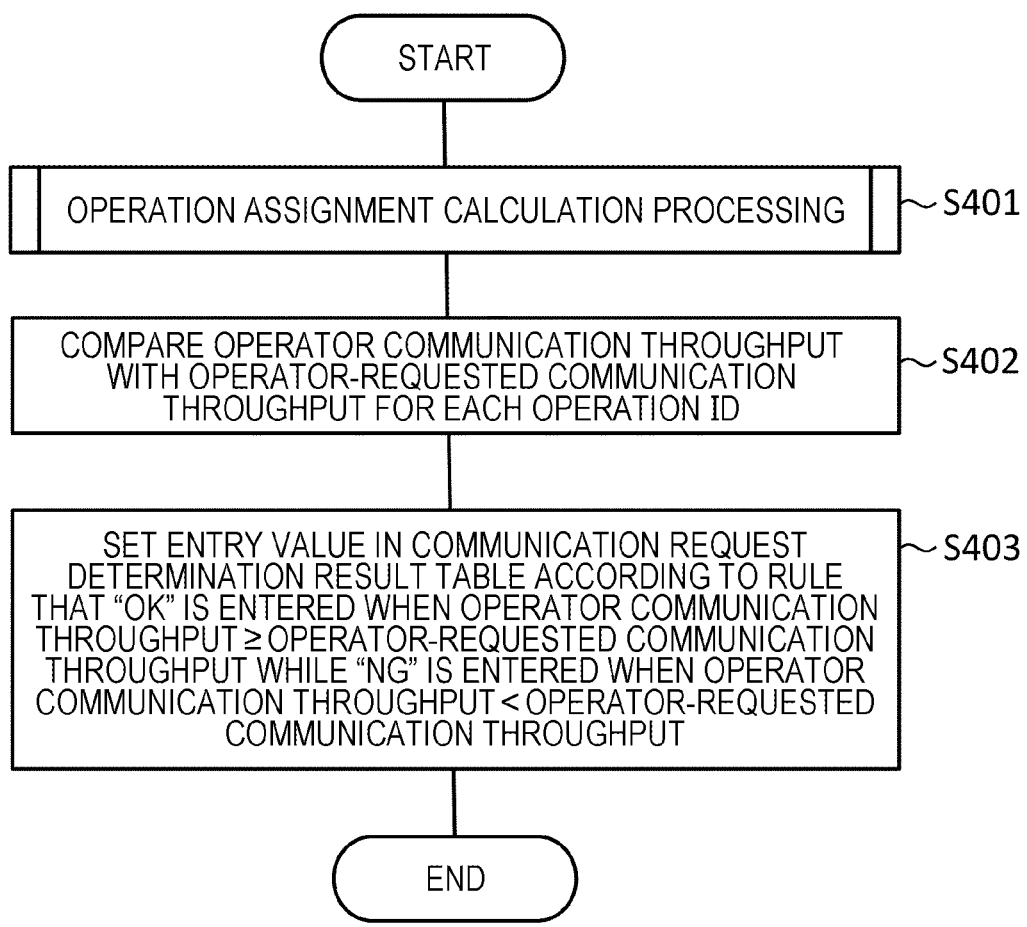
FIG. 24 is a flowchart showing details of a communication request determination processing (No. 1)

In the second embodiment, as shown in FIG. 24, whether a communication throughput required for an operator can be provided in an operation area is determined for each operator and whether a result of assigning an operator to an operation is proper or not is outputted.

The third embodiment relates to a work support apparatus that in executing the communication request determination processing, variously changes a condition for assigning an operator to an operation and determines and displays whether a result of the assignment is proper or not.

In the following description, differences from the second embodiment will mainly be explained.

Figure 26:
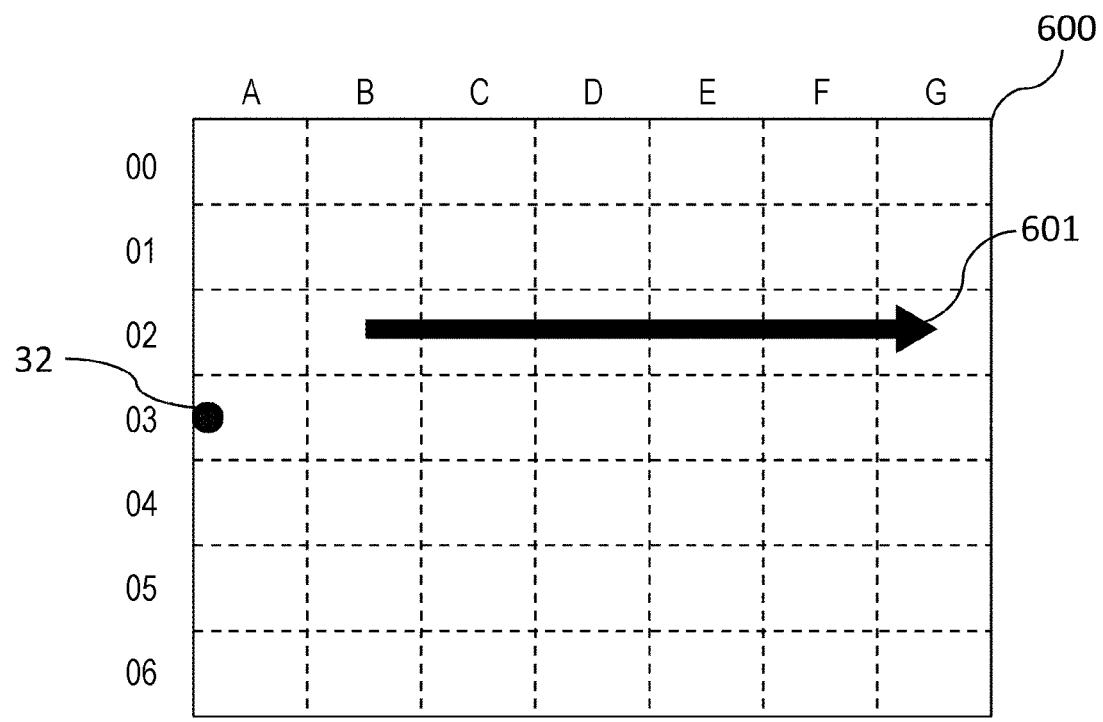
FIG. 26 is a diagram for explaining a relationship between a distance from an access point and communication performance.

First, an examination condition, which is examined when assigning an operator to an operation, will be described with reference to FIGS. 26 and 27.

When an apparatus used in each operation is a movable, a change in a workplace may be the examination condition. In general, communication performance tends to get lower as the distance from the access point 32 increases. For example, as shown in FIG. 26, when the access point 32 is set in an area with an area ID: A-03 relative to a place 600 where an operation in a manufacturing process is performed, it is generally considered that communication performance gets lower in a direction 601 of heading from the area ID: A- to the area ID: G-.

When an operation area where an operation is performed is changed, it may cause a change in an operator communication throughput, according to which an operator assigned to the operation is changed, and consequently a communication request determination result changes. For such a case, an operation layout condition 700 for changing areas where multiple processes are carried out may be inputted, the operation layout condition 700 being shown in FIG. 27. The operation layout condition 700 includes an operation layout ID 700a and a process line information field 700b. The operation layout ID 700a stores an ID for uniquely identifying an operation layout. The process line information field 700b stores information from the process line information table of FIG. 19.

Figure 28:
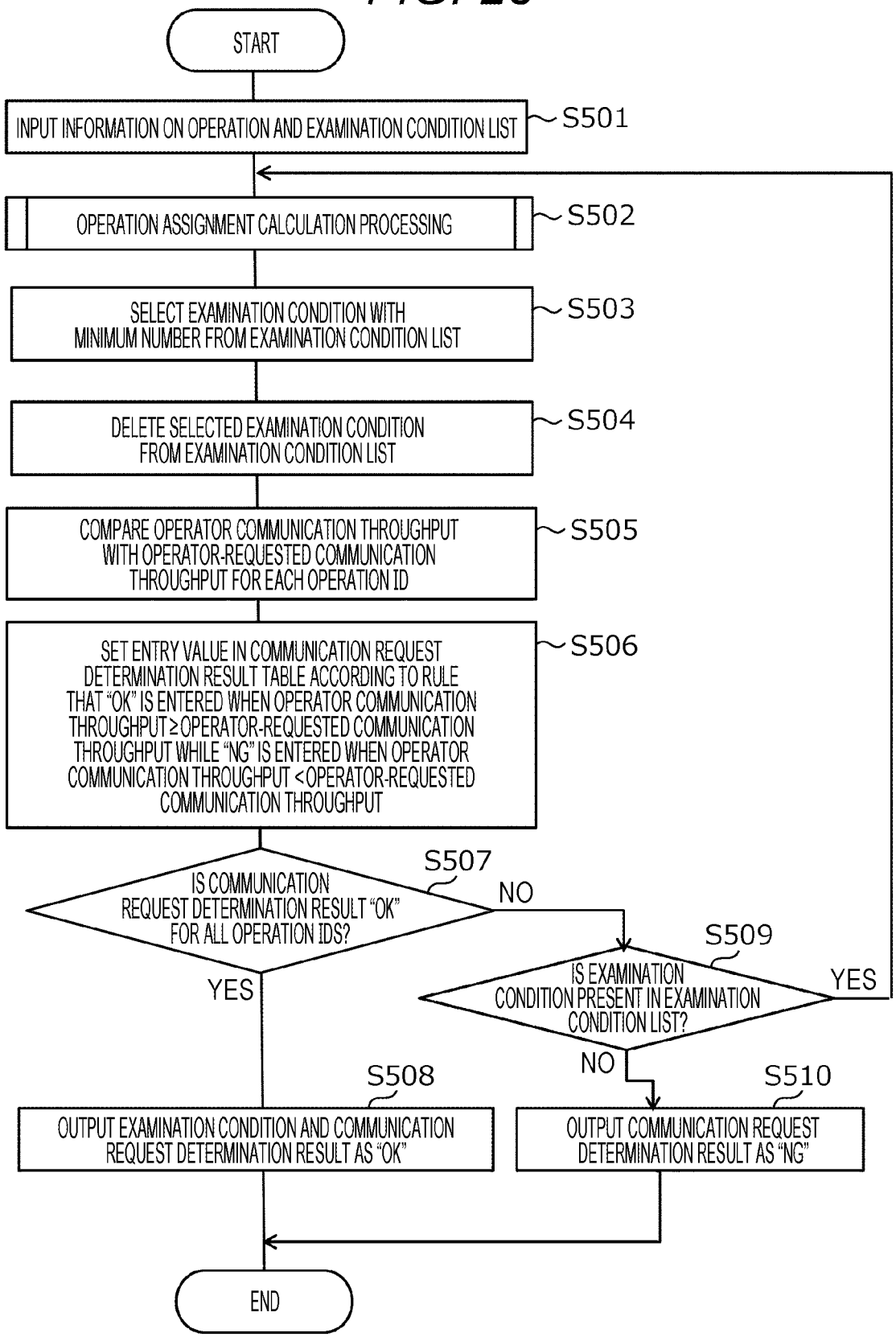
FIG. 28 is a flowchart showing details of a communication request determination processing (No. 2)

Details of the communication request determination processing will then be described with reference to FIG. 28.

First, information on an operation and an examination condition list are inputted to the work support apparatus 100 (S501). The examination condition list provides information shown in FIG. 27 when examination conditions define, for example, operation layouts related to processes. In this embodiment, examination conditions listed in the examination condition list are numbered, and an examination condition with a smaller number is in higher priority for examination.

The communication request determining unit 113 selects the examination condition with the smallest number out of examination conditions making up the examination condition list (S502).

Subsequently, the communication request determining unit 113 calls the operation assignment calculation unit 112, and performs processing on the selected examination condition, which is the same as the operation assignment calculation processing shown in FIG. 12 of the first embodiment (S503). The selected examination condition is then deleted from the examination condition list (S504).

Subsequently, the communication request determining unit 113 refers to the operation assignment result table 305 shown in FIG. 10, and for each operation ID indicated in the operation assignment result table 305, compares the entry value of the operator communication throughput 315e of the operation ID indicated in the apparatus-considered operation communication throughput relation table 315 shown in FIG. 21 with the entry value of the operator-requested communication throughput 304c indicated in the operator/operation-related required communication throughput relation table 304 shown in FIG. 9 (S505), and sets values in the operation ID 316a, the operator ID 316b, and the communication request determination result 316c in the communication request determination result table 316 shown in FIG. 22, respectively, according to a setting rule that "OK" is entered when operator communication throughput≥operator-requested communication throughput holds, while "NG" is entered when operator communication throughput<operator-requested communication throughput holds (S506).

The communication request determining unit 113 then determines whether the entry values of the communication request determination result 316c are "OK" for all operation IDs (S507). When the entry values are "OK" for all operation IDs (S507: Yes), the process flow proceeds to S508. When an entry value "NG" for an operation ID is found (S507: No), the process flow proceeds to S509.

When the entry values are "OK" for all operation IDs at step S507, an examination condition and information indicating a communication request determination result on the examination condition being "OK" are outputted (S508).

At S507, when an entry value "NG" for an operation ID is found, whether an examination condition is present in the examination condition list is determined (S509). When an examination condition is present in the examination condition list (S509: Yes), the process flow returns to S502. When no examination condition is present anymore in the examination condition list (S509: No), information indicating the communication request determination result being "NG" (an examination condition meeting a communication request is not present) is outputted (S510).

The above-described examination condition may be a condition that changes an operator ID for an operator who performs an operation of a process, or a condition that changes an assignment method decided through an assignment review.

As described with reference to FIGS. 26 and 27, when an apparatus used in each operation is movable, a condition that changes a workplace may be adopted as the examination condition.

A user interface related to output of a result of the communication request determination processing will then be described with reference to FIG. 29.

FIG. 29 depicts an example in which an operation layout is adopted as an examination condition.

A communication request determination result screen 700 displays an operation layout ID display column 701, a communication request determination result display column 702, a process line information display column 703, and a layout display column 704.

The operation layout ID display column 701 displays an entry value of the operation layout ID 700a of the operation layout condition 700 of FIG. 27. The communication request determination result display column 702 displays "OK" when an examination condition that meets a communication request is present for an operation of a process to be carried out, but displays "NG" when the examination condition is not present. The process line information display column 703 displays the entry values of the process line information field 700b of the operation layout condition 700 of FIG. 27 when the examination condition is met. The layout display column 704 displays a layout showing a visual image of a relationship between operations and areas in the processes displayed in the process line information display column 703.

In the above example, the examination condition is a condition that changes a workplace. When, for example, six types of processes are carried out as combinations of two types of processes in a given period, however, assignment of an operator to an operation may be examined by changing combinations of processes.

In the above example, an area where an operation is performed is changed for each process. When a process consisting of a series of operations to execute can be divided by utilizing a transport vehicle, etc., however, a workplace may be changed for each operation unit into which the process can be divided.

According to this embodiment, when an examination condition is inputted once, the examination condition is put into trials and its validity is determined consecutively until a communication request determination result "OK" is obtained or a determination on multiple conditions inputted is made. This saves the process supervisor time and effort for inputting.

The present invention is not limited to the above-described embodiments, and includes various modifications and configurations equivalent thereto, which are within the scope of the appended claims. For example, even in the case where communication for controlling an apparatus used for an operation, such as a processing machine, is made by a communication method different from a communication method for operation support, for example, by using wired communication or through wireless communication different from the communication for operation support, the case being described as a preferable case in the first embodiment, it may be devised such that whether a communication throughput required for each operator can be provided in an operation area is determined to output a result of appropriateness for assigning an operator to an operation, or a plurality of conditions are inputted, as described in the second and third embodiments. In such a case, a non-operator-dependent apparatus-required throughput value is taken to be 0 and an operator communication throughput is considered to be equivalent to a predicted communication throughput.

The above embodiments have been described in detail for easy understanding of the present invention, and are not necessarily limited to embodiments including all the constituent elements described above. For example, the work support apparatus, which is connected to the network in FIG. 2, may be used as a stand-alone apparatus not connected to the network.

What is claimed is:

1. A work support apparatus that assigns an operator to an operation performed in a workplace, wherein a communication device used for the operation is installed in the workplace, the work support apparatus holding:
    relation information on a relationship between a process, the operation, and each of areas and the communication device used for the operation, the areas being created by dividing the workplace into a plurality of sections;
    information on a predicted communication throughput by the communication device in each of the areas created by dividing the workplace into the plurality of sections; and
    information on an operator-requested communication throughput for a combination of the operation and an operator, wherein
    for each operation corresponding to the process, the work support apparatus determines assignment of an operator to the operation, referring to the predicted communication throughput by the communication device and the operator-requested communication throughput, and outputs a result of the operator assignment.

2. The work support apparatus according to claim 1, wherein the communication device used for the operation in the workplace carries out wireless communication.

3. The work support apparatus according to claim 1, wherein
    an operation with a minimum predicted communication throughput by the communication device used for the operation is selected out of operations included in a process, and
    an operator for which an operator-requested communication throughput for a combination of the selected operation and an operator is minimum is selected, and assignment of an operator to the operation is determined.

4. The work support apparatus according to claim 1, wherein in a process of determining assignment of an operator to the operation, a result indicating assignment of an operator to the operation being appropriate is outputted when a predicted communication throughput by the communication device is equal to or more than the operator-requested communication throughput.

5. The work support apparatus according to claim 1, wherein
    the relation information on the process includes a plurality of examination conditions, and
    whether assignment of an operator to the operation is appropriate is determined for all combinations of the operation and an operator to which the operation is assigned until a predicted communication throughput by the communication device becomes equal to or more than the operator-requested communication throughput.

6. The work support apparatus according to claim 5, wherein the plurality of examination conditions are conditions according to which the operator is changed.

7. The work support apparatus according to claim 5, wherein the plurality of examination conditions are conditions according to which the operation is changed.

8. The work support apparatus according to claim 5, wherein the plurality of examination conditions are conditions according to which an operation layout in the process is changed.

9. The work support apparatus according to claim 1, wherein
    a predicted communication throughput by the communication device is a sum of an operator communication throughput that changes for each operator and a non-operator-dependent apparatus-requested communication throughput that does not change for each operator,
    an operation for which the operator communication throughput is minimum is selected out of operations included in a process, and
    an operator for which an operator-requested communication throughput for a combination of the selected operation and an operator is minimum is selected, and assignment of an operator to the operation is determined.

10. The work support apparatus according to claim 9, wherein in a process of determining assignment of an operator to the operation, a result indicating assignment of an operator to the operation being appropriate is outputted when the operator communication throughput is equal to or more than the operator-requested communication throughput.

11. The work support apparatus according to claim 9, wherein
    the relation information on the process includes a plurality of examination conditions, and
    whether assignment of an operator to the operation is appropriate is determined for all combinations of the operation and an operator to which the operation is assigned until the operator communication throughput becomes equal to or more than the operator-requested communication throughput.

12. A work support method of assigning, by a work support apparatus, an operator to an operation performed in a workplace, wherein a communication device used for the operation is installed in the workplace, the work support apparatus holding:
- relation information on a relationship between a process, the operation, and each of areas and the communication device used for the operation, the areas being created by dividing the workplace into a plurality of sections;
- information on a predicted communication throughput by the communication device in each of the areas created by dividing the workplace into the sections; and
- information on an operator-requested communication throughput for a combination of the operation and an operator,
- the method comprising determining, for each operation corresponding to the process, assignment of an operator to the operation, referring to the predicted communication throughput by the communication device and the operator-requested communication throughput, and outputting a result of the operator assignment.

* * * * *